US006662077B2

(12) United States Patent
Haag

(10) Patent No.: US 6,662,077 B2
(45) Date of Patent: Dec. 9, 2003

(54) ARCHITECTURE FOR PRESENTING AND MANAGING INFORMATION IN AN AUTOMATED PARKING AND STORAGE FACILITY

(76) Inventor: Gerhard Haag, 12812 N. 60th St., Clearwater, FL (US) 33760

( * ) Notice: Subject to any disclaimer, the term of this patent is extended or adjusted under 35 U.S.C. 154(b) by 0 days.

(21) Appl. No.: 10/252,235

(22) Filed: Sep. 23, 2002

(65) Prior Publication Data

US 2003/0069665 A1 Apr. 10, 2003

Related U.S. Application Data

(63) Continuation-in-part of application No. 09/812,416, filed on Mar. 20, 2001, now Pat. No. 6,502,011, which is a continuation-in-part of application No. 09/364,934, filed on Jul. 30, 1999, now abandoned.

(51) Int. Cl.[7] .................................................. G06F 7/00

(52) U.S. Cl. ....................... 700/217; 414/231; 414/234; 340/932.2

(58) Field of Search ................................. 700/213, 217; 414/227, 231, 232 R, 234–264; 340/932.2; 345/810, 905, 700

(56) References Cited

U.S. PATENT DOCUMENTS 6,501,391 B1 * 12/2002 Racunas, Jr. ............. 340/932.2
6,502,011 B2 * 12/2002 Haag .......................... 700/217

* cited by examiner

*Primary Examiner*—Khoi H. Tran
(74) *Attorney, Agent, or Firm*—Tucker Ellis & West LLP

(57) ABSTRACT

Architecture for management of an automated parking and storage facility. A management system provides interactive interface capability to access, monitor, and control the parking and storage facility locally and remotely, as well as to provide limited access locally and remotely to a patron for obtaining facility products and services. In support of operator interaction, the interface includes graphic objects displayed in relation to facility components such as a facility floor thereby representing the state of the floor, which graphic objects are associated with facility components allowing the operator to monitor, control and perform diagnostics therewith. In support of patron interaction, the interactive interface includes web page capability to a patron node wherein the patron can obtain occupancy information and transact to reserve or secure a storage space.

40 Claims, 20 Drawing Sheets

| Time | Car ID | From | To | Travel | Get | Travel | Put Vlc | Hoist | Travel | Get | Travel | Put EES | Car Available |
|---|---|---|---|---|---|---|---|---|---|---|---|---|---|
| 9:12:28 AM | 9 | 3011 | 1053 | 12 | 31 | 12 | 23 | 9 | 0 | 13 | 0 | 20 | 108 |
| 9:18:18 AM | 5 | 3053 | 1053 | 0 | 23 | 0 | 23 | 9 | 0 | 13 | 0 | 20 | 98 |
| | No. | | 2 | | | | | | | | | Avg. | 96 |

| Time | Car ID | From | To | Travel | Get | Travel | Put Vlc | Hoist | Travel | Get | Travel | Put EES | Car Available |
|---|---|---|---|---|---|---|---|---|---|---|---|---|---|
| 7:19:58 AM | 10 | 1011 | 1053 | 0 | 0 | 0 | 0 | 0 | 12 | 31 | 12 | 16 | 59 |
| 7:20:33 AM | 3 | 1061 | 1103 | 0 | 0 | 0 | 0 | 0 | 8 | 31 | 8 | 16 | 55 |
| 7:21:14 AM | 9 | 2011 | 1053 | 12 | 31 | 12 | 23 | 8 | 0 | 13 | 0 | 20 | 107 |
| 7:21:45 AM | 19 | 5011 | 1053 | 12 | 31 | 12 | 23 | 12 | 0 | 13 | 0 | 20 | 111 |
| 7:22:13 AM | 6 | 2053 | 1053 | 0 | 23 | 0 | 23 | 8 | 0 | 13 | 0 | 20 | 87 |
| 7:22:43 AM | 12 | 6081 | 1103 | 8 | 31 | 8 | 23 | 12 | 0 | 13 | 0 | 20 | 107 |
| 7:23:13 AM | 1 | 4061 | 1103 | 8 | 31 | 8 | 23 | 10 | 0 | 13 | 0 | 20 | 105 |
| 7:23:46 AM | 17 | 7011 | 1053 | 12 | 31 | 12 | 23 | 14 | 0 | 13 | 0 | 20 | 113 |
| 7:24:25 AM | 15 | 6053 | 1053 | 0 | 23 | 0 | 23 | 12 | 0 | 13 | 0 | 20 | 91 |
| 7:24:55 AM | 7 | 4011 | 1053 | 12 | 31 | 12 | 23 | 10 | 0 | 13 | 0 | 20 | 109 |
| 7:25:29 AM | 5 | 3053 | 1053 | 0 | 23 | 0 | 23 | 9 | 0 | 13 | 0 | 20 | 88 |
| 7:25:59 AM | 4 | 4053 | 1053 | 0 | 23 | 0 | 23 | 10 | 0 | 13 | 0 | 20 | 89 |
| 7:26:32 AM | 16 | 6011 | 1053 | 12 | 31 | 12 | 23 | 12 | 0 | 13 | 0 | 20 | 111 |
| 7:27:02 AM | 8 | 3011 | 1053 | 12 | 31 | 12 | 23 | 9 | 0 | 13 | 0 | 20 | 108 |
| 7:27:30 AM | 2 | 3081 | 1103 | 8 | 31 | 8 | 23 | 9 | 0 | 13 | 0 | 20 | 104 |
| 7:27:52 AM | 14 | 7053 | 1053 | 0 | 23 | 0 | 23 | 14 | 0 | 13 | 0 | 20 | 93 |
| 7:28:12 AM | 16 | 5053 | 1053 | 0 | 23 | 0 | 23 | 12 | 0 | 23 | 8 | 16 | 105 |
| | No: | | 17 | | | | | | | | | Avg. | 97 |

ARCHITECTURE FOR PRESENTING AND MANAGING INFORMATION IN AN AUTOMATED PARKING AND STORAGE FACILITY

This application is a Continuation-In-Part of pending U.S. patent application Ser. No. 09/812,416 entitled "Method and Apparatus for Distributing and Storing Pallets in an Automated Parking Structure" filed Mar. 20, 2001 is now U.S. Pat. No. 6,502,011, which is a Continuation-In-Part of U.S. Ser. No. 09/364,934 entitled "Method and Apparatus for Distributing and Storing Pallets in an Automated Parking Structure" filed Jul. 30, 1999 now abandon, both of which are incorporated by reference, and is related to U.S. patent application Ser. No. 10/133,557 entitled "Automated Parking Garage" filed Apr. 27, 2002.

BACKGROUND OF THE INVENTION

The present invention is concerned with the field of automated parking and storage systems, and more particularly, a software interface for monitor, control, operation, and presentation thereof.

BACKGROUND OF THE ART

Automated mechanical parking garage systems have been employed since the late 1950's. Early automated parking garages utilized crane systems, conveyors, hydraulics and pneumatics to transport and store vehicles within a parking structure. Recently, more advanced systems have been developed which include computer-controlled, specialized equipment for carrying vehicles to assigned parking spaces in much the same way that computerized assembly lines or warehouses store and retrieve miscellaneous goods.

Examples of automated parking garage systems are described in the following references: U.S. Pat. No. 5,467,561 by Takaoka, entitled "Automated High-Raised Parking System," which issued Nov. 21, 1995; U.S. Pat. No. 5,556,246 by Broshi, entitled "Automated Storage System," which issued Sep. 17, 1996; U.S. Pat. No. 5,573,364 by Schneider et al., entitled "Automated Parking System For Motor Vehicles," which issued Nov. 12, 1996; and U.S. Pat. No. 5,669,753 by Schween, entitled "Modular Automated Parking System", which issued Sep. 23, 1997.

Since the early 1980's, many computer-based systems have employed a graphical user interface (GUI) to present information to and receive input from a user or operator. In many cases, such a GUI is little more than an alternative expression of a traditional interface. For example, certain operating systems employ the GUI to collect and display substantially the same information as traditional text-based operating systems (where a GUI is defined as any computer interactive interface that substitutes graphics for characters, which graphics are manipulated by a pointing device, e.g., a mouse or trackball, and which graphics are displayed utilizing a processor).

Although both automated parking technology and GUI technology have co-existed for the last twenty years, there are no known GUIs for applications that control the operation of an automated parking and storage system. Moreover, there are no user interfaces, graphical or otherwise, which present the status of the components in an automated parking and storage system in an intuitive and unambiguous way suitable for a novice operator.

Accordingly, there is a need for architecture that addresses the shortcomings of the prior art. Specifically, there is a need for architecture that presents and manages information in the automated parking and storage facility in an intuitive and unambiguous way, enabling even a novice operator to understand the status of the components of the automated parking system. Further, there is a need for a system that graphically provides alerts regarding the status of components of the automated parking and storage system and enables an operator to take corrective action using the same display interface presenting the alert.

SUMMARY OF THE INVENTION

The invention disclosed and claimed herein, in one aspect thereof, is management system architecture for management of an automated parking and storage facility using an interactive interface such as a GUI. The interactive interface is utilized to display a graphical representation of various components of the automated parking and storage facility. The method also includes steps for displaying a number of graphical objects in relation to a virtual floor or level of the facility. In this way, the present invention represents the entire state of the automated parking and storage facility.

The graphical objects displayed in relation to the floor approximate the actual physical layout of the floor and may include an entry/exit station (EES), a module for transporting a vehicle along an x-axis, a module for transporting a vehicle along a y-axis, a module for transporting a vehicle along a z-axis and vehicle storage racks. In some cases, duplicate elements may be displayed to accurately depict the floor layout. For example, three EES objects may be displayed to represent a floor having three EES.

The present invention further includes the process of displaying a plurality of control objects. Each control object is associated with controlling an aspect of the automated parking and storage system. For example, a control object may be a graphical button used to start or stop a physical process. Of course, an object displayed in relation to the floor may also act as a control object. For example, a vertical lift conveyor object may be selected by an operator to monitor or control the operation of physical vertical lift conveyor equipment.

The plurality of graphical objects include at least the representation of the EES for ingress and egress of the automated parking garage and storage facility of a vehicle or item, a transport module for transporting the vehicle or item within the automated parking garage and storage facility, and a plurality of storage racks for storing the vehicle or item. The GUI also displays vehicle or item dimensioning and imaging information, and detailed diagnostic information for various facility system components.

The disclosed architecture further includes the capability of allowing an operator to access the management system from either or both a local node and a remote node, which nodes are in operative communication with the management system. The operator can then manage operation of the facility through monitor and control of various components of the facility, as well as retrieve stored information.

The architecture further includes the capability of allowing a user at a remote interactive node to access selected information of the management system via a web site. The web site provides one or more web pages accessible by the user for obtaining parking and storage information. The information includes, but is not limited to, occupancy information so that the user can ascertain whether the facility has an available storage rack, and on-line transaction capability to that the user can pay to reserve or secure one or more storage racks for future use.

BRIEF DESCRIPTION OF THE DRAWINGS

The foregoing and other objects, features and advantages of the invention will become more fully understood from the following description of the preferred embodiment of the invention as illustrated in the accompanying drawings in which like reference characters refer to the same parts throughout different views. The drawings are not necessarily to scale, emphasis instead being placed upon illustrating the principles of the invention.

DETAILED DESCRIPTION OF THE PREFERRED EMBODIMENT

Figure 1:
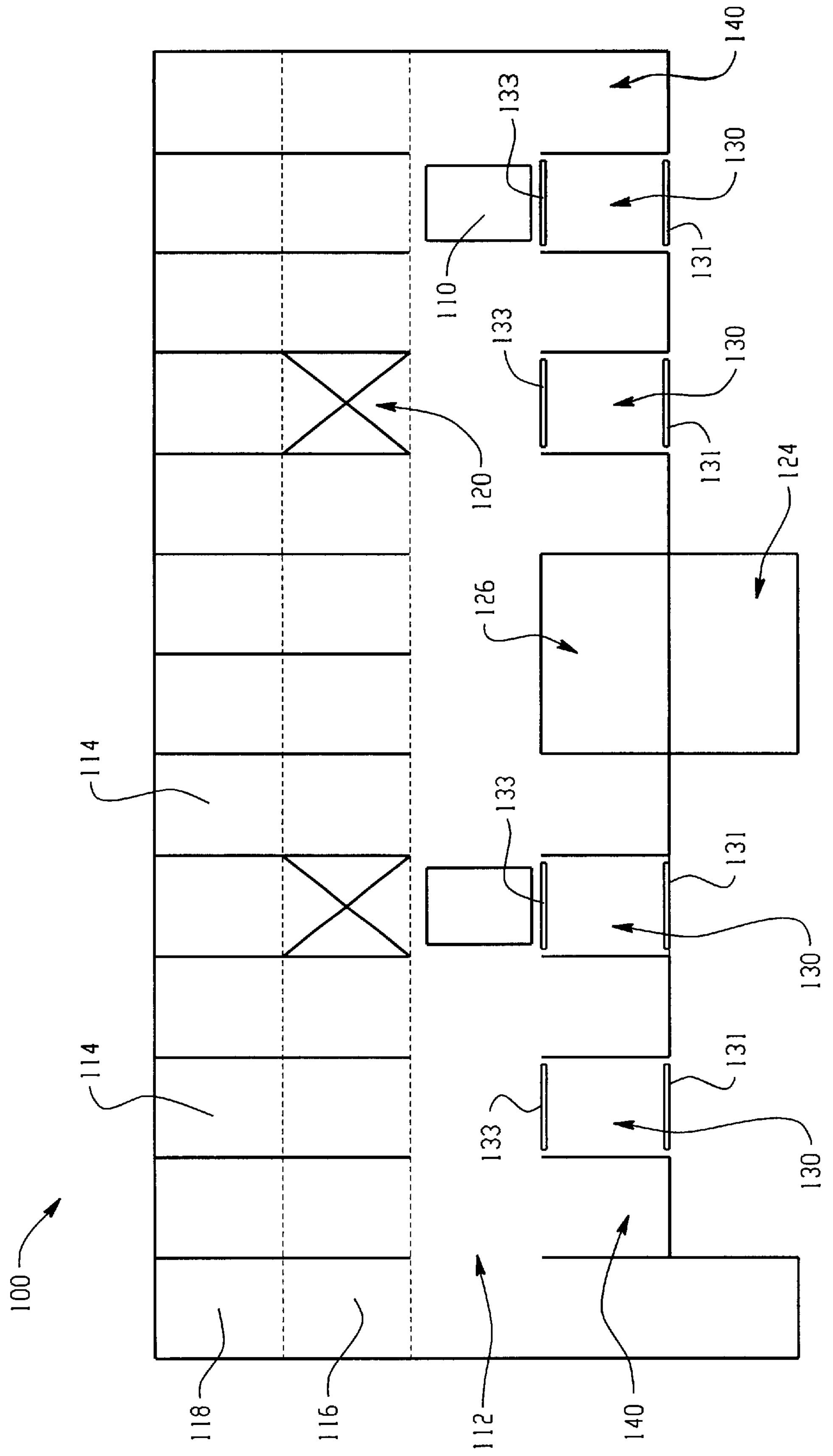
FIG. 1 illustrates a plan view of an entry floor of an automated parking garage and storage facility employing the present invention.

Referring now to the drawings, FIG. 1 illustrates a general floor plan or level layout of an entry level floor of an automated parking garage and storage facility 100 that incorporates the architecture for management thereof using an interactive interface, e.g., a graphical interface, according to the present invention. Note that the automated parking garage and storage facility 100 is suitably designed to not only accommodate vehicles, but other items such as containers, water craft, or any items that meet the predetermined dimension criteria for storage in the facility 100. Thus the automated parking garage 100 is also referred to as an automated parking garage and storage facility 100, and where reference is made to parking of a vehicle, it is intended to also include the storage of an item. As shown, one component, the entry level floor of the automated parking garage 100 includes four (4) entry/exit stations (EES) 130. Each EES 130 is for receiving and releasing vehicles stored in the automated parking garage 100. Several pallet stacking stations 140 are located near the EES 130. Of course, more or fewer EES 130 may be employed depending on the actual and projected throughput of the garage 100. The pallet stacking stations 140 store empty pallets that are used for handling vehicles or items during storage and retrieval operations. A pallet is removed from a pallet stacking station 140 and distributed to an EES 130 as necessary to accommodate an incoming vehicle. A pallet is removed from an EES 130 and stored in a pallet stacking station 140 as necessary to accommodate an outgoing vehicle. Pallets are transported between EES 130 and pallet stacking stations 140 using a pallet shuttle (not shown) in a manner described in U.S. patent application Ser. No. 09/364,934.

The automated parking garage 100 includes a number of storage slots 114 for storing vehicles. As shown, each storage slot 114 of a floor or level may store up to two vehicles. A first vehicle may be stored in an interior rack 116 and a second vehicle may be stored in an exterior rack 118 of the storage slot 114. In addition to the storage slots 114 available for vehicles shown in FIG. 1, storage slots 114 for vehicles may be provided on upper and/or lower floors (not shown) of the automated parking garage 100. In support thereof, one or more vertical lift conveyors (VLC) 120 are provided for transporting vehicles and associated pallets between floors of the automated parking garage 100.

During storage and retrieval operations, a vehicle is transported on a supporting pallet between the interior rack 116 or exterior rack 118 of the storage slot 114 and the EES 130 using a lower carrier module (LCM) 110 for storage in a entry level floor, or utilizing an upper carrier module (UCM) for storage on a level different from the entry level floor. The carrier module 110 accomplishes such transportation via an aisle 112. The carrier module 110 includes a rack entry module (REM) (not shown) for transferring a pallet carrying a vehicle (i.e., a loaded pallet) between the carrier module 110 and the interior storage rack 116 or exterior storage rack 118, the EES 130 or VLC 120.

Components of the automated parking garage 100, including, for example, the VLC 120, carrier module 110, the REM (not shown), an exterior door 131 and an interior door 133 to EES 130, are controlled by the management system. The management system is defined as the software utilized for managing the automated parking garage and storage facility 100, that is, the user interface and control software for accessing information, monitoring and controlling the components thereof, and providing website capability. The central computer system (also denoted the central computer), executing the management system software, is preferably housed in a control room 126. The central computer includes a monitor and input device, and is used by an operator to monitor and control operations of automated parking garage 100. The automated parking garage 100 further includes a lobby 124 where customers may wait for their vehicles to be retrieved and pay for the automated parking service.

When a vehicle enters the automated parking garage 100, the vehicle enters the EES 130 through the open exterior door 131 and moves onto a pallet. Before the vehicle enters the EES 130, the interior door 133 is closed to prevent the vehicle occupants from accessing the interior of the automated parking garage 100. The driver and passengers of the vehicle then exit the vehicle and the EES 130, and activate the automated parking system, thereby causing the exterior door 131 to close. The carrier module 110 moves along the aisle 112 to a position corresponding to the EES 130 through which the vehicle entered the garage 100. The REM of carrier module 110 extends from the carrier module 110 into the EES 130, elevates the pallet and vehicle or item (i.e., a loaded pallet) in a supporting position, and retracts the loaded pallet from the EES 130 back onto the carrier module 110. The central computer determines an empty rack (either interior or exterior) in which to store the vehicle and supporting pallet. The central computer directs the carrier module 110 to traverse the aisle 112 to a position corresponding to the predetermined empty rack.

In the event that the predetermined rack is located on a different floor of the garage 100, the carrier module 110 is positioned by the control computer across from the VLC 120, and causes the REM to transfer the pallet and vehicle to the VLC 120. The REM is operable to rotate one hundred eighty degrees on command such that the vehicle is retrieved to the EES 130 so the customer can drive out of the EES 130, instead of having to back out. The VLC 120 transports the pallet and vehicle to the appropriate floor of the automated parking garage 100 where the loaded pallet is transferred to the UCM. Once the UCM carrying the pallet and vehicle is in a position corresponding to the predetermined rack, the REM extends into the rack (either interior or exterior rack) to transfer the pallet and vehicle or item to the predetermined rack for storage. One of ordinary skill will understand that similar steps may be executed when retrieving a loaded pallet from a storage rack.

As mentioned hereinabove, operation of the garage 100 is monitored and controlled by the central computer executing the management system software via the interactive interface. FIGS. 2–7 illustrate various windows and graphics displayed by the garage control application to enable an operator to monitor and control operation of the automated parking system.

Figure 2A:
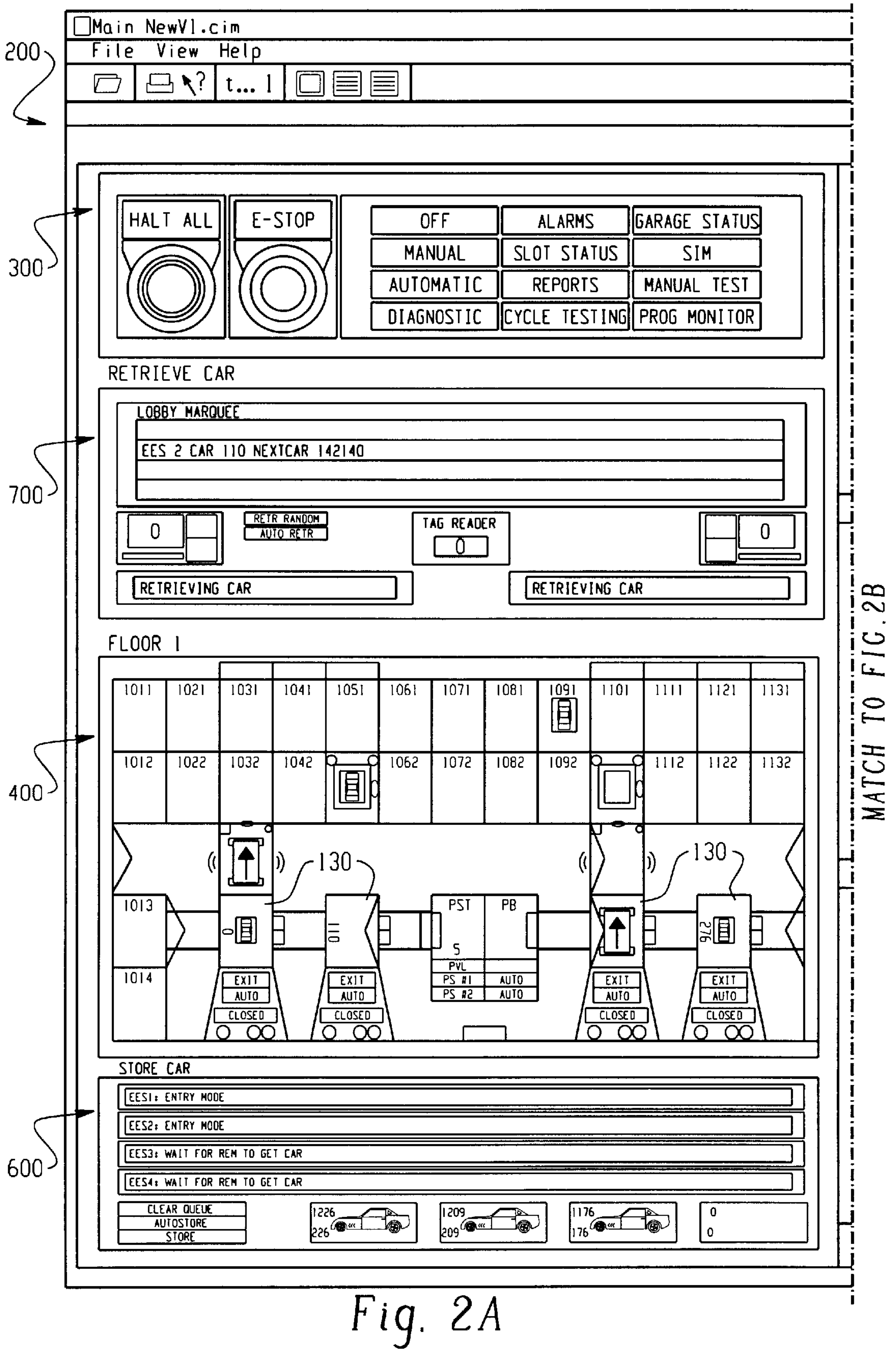
FIGS. 2A–2C illustrate a computer screen display of a main control window displayed by a computer controlling the operation of the automated parking garage and storage facility of FIG. 1.
Figure 2B:
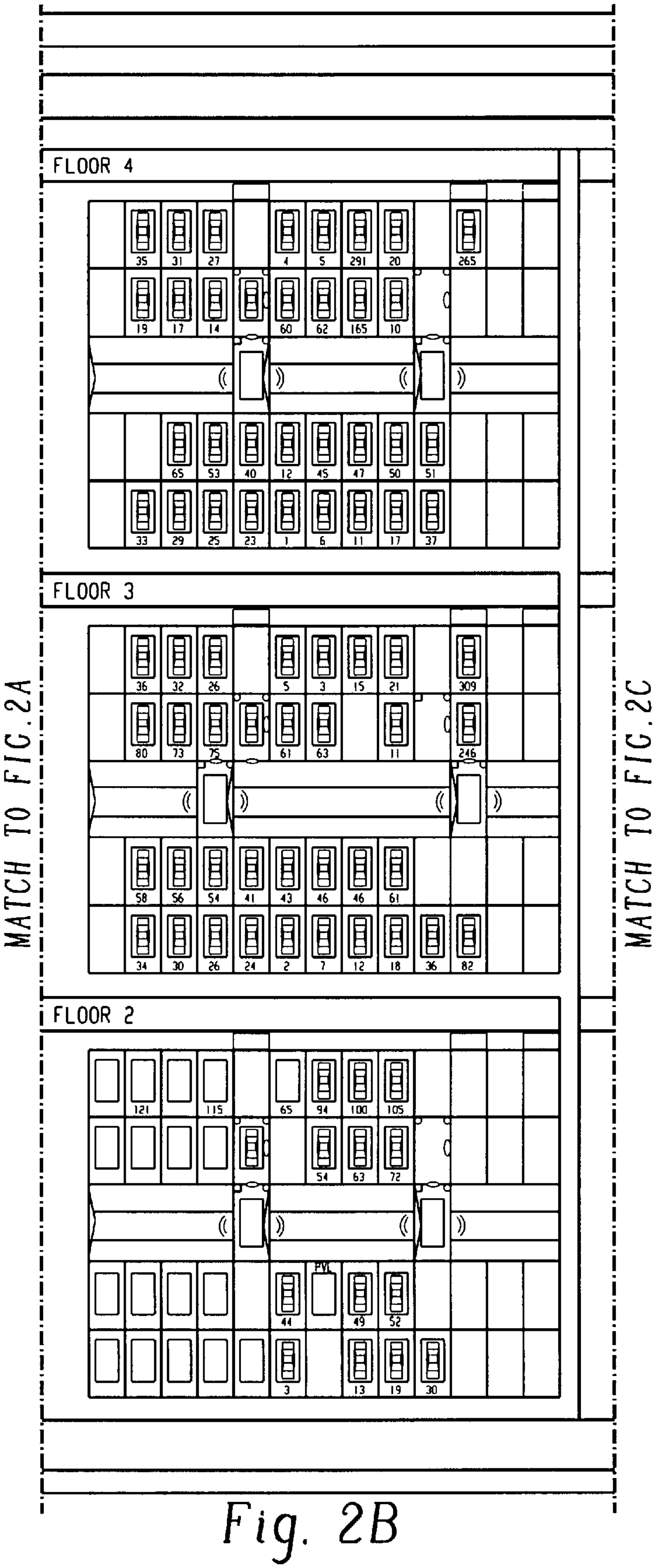
Figure 2C:
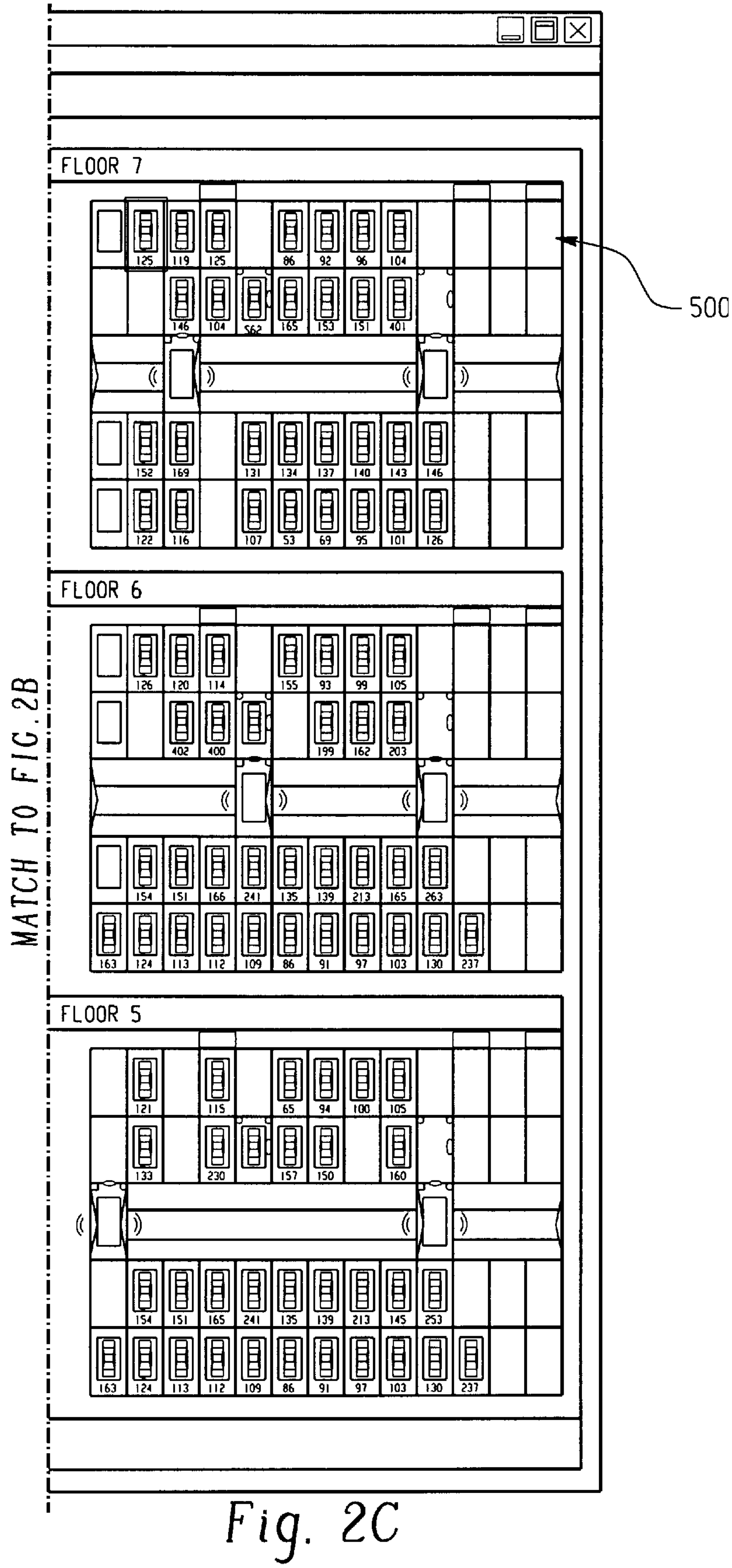

Referring now to FIGS. 2A–2C, there is illustrated a computer screen of a Main Control window 200 which is displayed by the central computer controlling operation of automated parking garage 100. The Main Control window 200 includes a global control panel (GCP) portion 300 that includes objects utilized for monitor and control of the overall operation of automated parking garage 100, a Store Car panel portion 600 for controlling the storage of vehicles within automated parking garage 100, and a Retrieve Car panel portion 700 for controlling the retrieval of vehicles from automated parking garage 100. An entrance level display area 400 of FIG. 2A presents graphics representative of the physical components and status of the first floor through which vehicles enter and exit the garage 100. The contents and status of the other floors are similarly displayed. Portions of the Main Control window 200 of FIG. 2B and FIG. 2C further include graphical representations of each of the floors of automated parking garage 100. One example of such a display is a seventh floor display area 500 of FIG. 2C.

Figure 3:
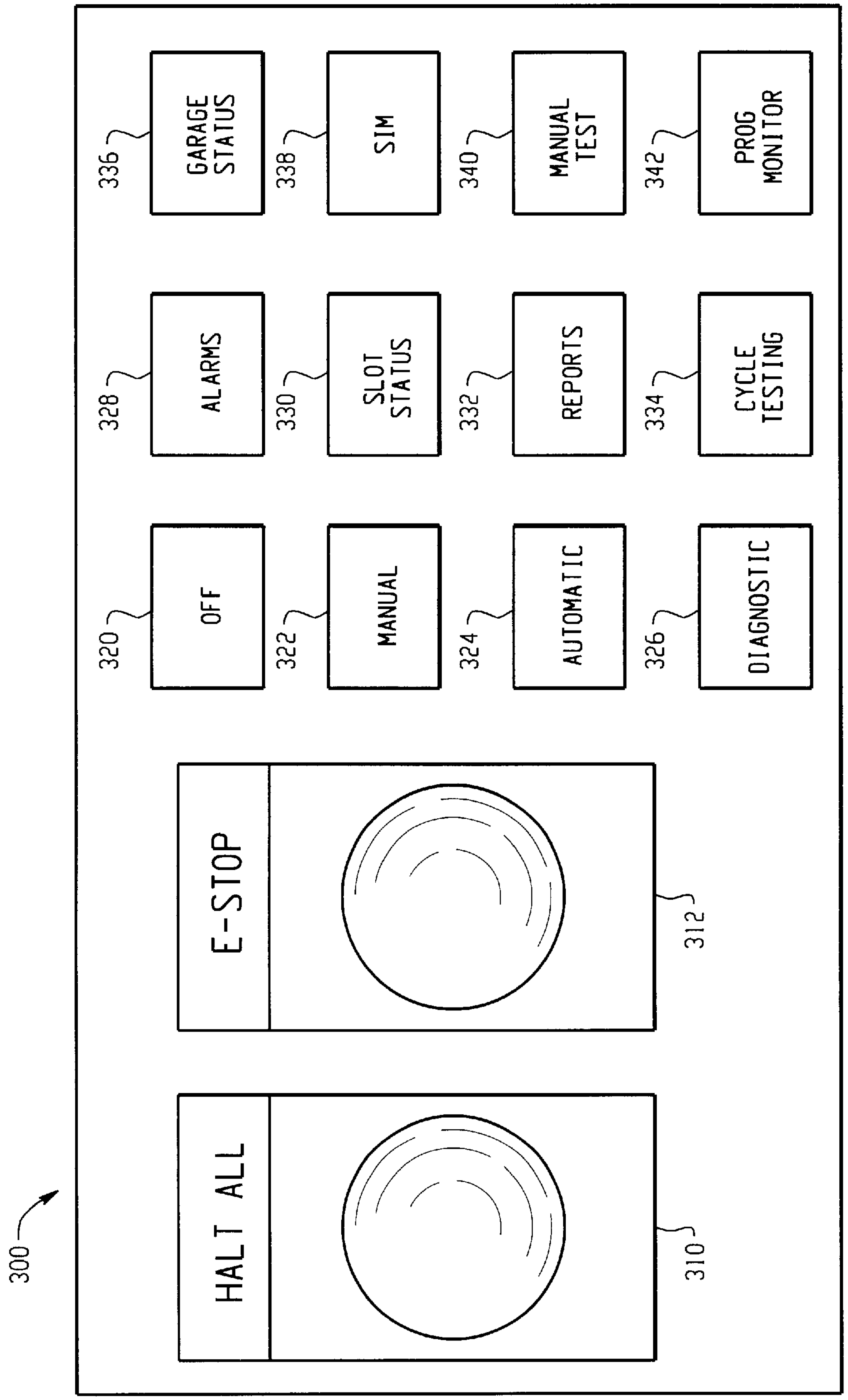
FIG. 3 illustrates a computer screen display of the global control panel of the main control window of FIG. 2.

Referring now to FIG. 3, there is illustrated the GCP portion 300 of the Main Control window 200. The control system can be operated in both automatic and semi-automatic mode, or a combination of these modes. The normal mode of operation is automatic wherein the garage 100 runs completely under control of the computer control system. That is, no operator actions are required for storing or retrieving vehicles. In automatic mode, it is possible to run some of the equipment in semi-automatic mode, where the operator directs operation of the equipment. Usually, semi-automatic mode is used in testing or where automatic mode does not support a particular function such as for maintenance or manual mode.

The GCP portion 300 contains objects that report the status of the automated parking garage 100 and allows an operator to control the garage 100 as a whole. On the left hand side of the GCP 300, there are illustrated controls denoted "Halt All" 310 and "E-Stop" 312, both of which are utilized stopping operation of the components of the automated parking garage 100. The "Halt All" button 310 enables the operator to direct the management system control program of the control computer to stop sending any commands to the components of automated parking garage 100. While no new commands will be sent, all current commands are processed to completion. The "Halt All" button 310 is particularly useful to shut down systems of the garage 100, for example, for equipment inspection and maintenance. The "E-Stop" button 312 enables the operator to initiate a "system hard stop" signal to the control program that immediately stops the motion of every component of the garage 100.

On the right side of the GCP 300, there are three columns of buttons that enable the operator to control and/or monitor the operation of the garage 100. The operator may select an "Off" button 320 to take the systems of the garage 100 out of automatic or semi-automatic mode, effectively disabling all aspects of the garage 100 from software control. A "Manual" button 322 enables the operator to manually direct the control of all components of the parking garage through software controls in the semi-automatic mode. An "Automatic" button 324 enables the operator to signal the control system to begin full automatic operation, thereby directing that the components of the garage be controlled according to pre-programmed parameters. A "Diagnostics" button 326 enables the operator to present a screen of diagnostic information related to various components of the garage 100.

Operator selection of an "Alarms" button 328 causes an alarm management window to be opened. The alarm management window enables the operator to review and control the status of all alarms associated with the garage. When an alarm is generated, the "Alarms" button 328 is highlighted and an audible warning is presented. Note that the management system can be suitably configured to communicate an alert or alarm to a remote operator via a paging device, or other wireless device personal to the operator, in addition to the interactive interface. Additionally, the alarm or alert can be transmitted to one or more designated facsimile machines, e-mail addresses, or other communication nodes. Selection of a "Slot Status" button 330 causes a window to be presented that enables the operator to review the status of any requested slot within the garage 100. A "Reports" button 332 opens a reports window that allows the operator to display and print reports regarding the operation of the garage 100. Selecting a "Cycle Testing" button 334 causes presentation of a window that shows the cycle testing modules, thereby enabling the operator to test the cycles of certain hardware used in the operation of the garage 100. Operator selection of a "Garage Status" button 336 causes a window to be displayed that shows the current vehicle inventory and the queued store and retrieve commands. Selection of a "SIM" button 338 allows the operator to perform a simulated run of the software utilizing the connected hardware. A "Manual Test" button 340 allows the user to run a test in manual mode. Selection of a "Prog Monitor" button 342 allows the operator to monitor execution of the program. The "SIM," "Manual Test," and "Prog Monitor" selections are used primarily for setup and testing of the control system, and can be inactivated during normal automatic and semi-automatic operations.

Figure 4A:
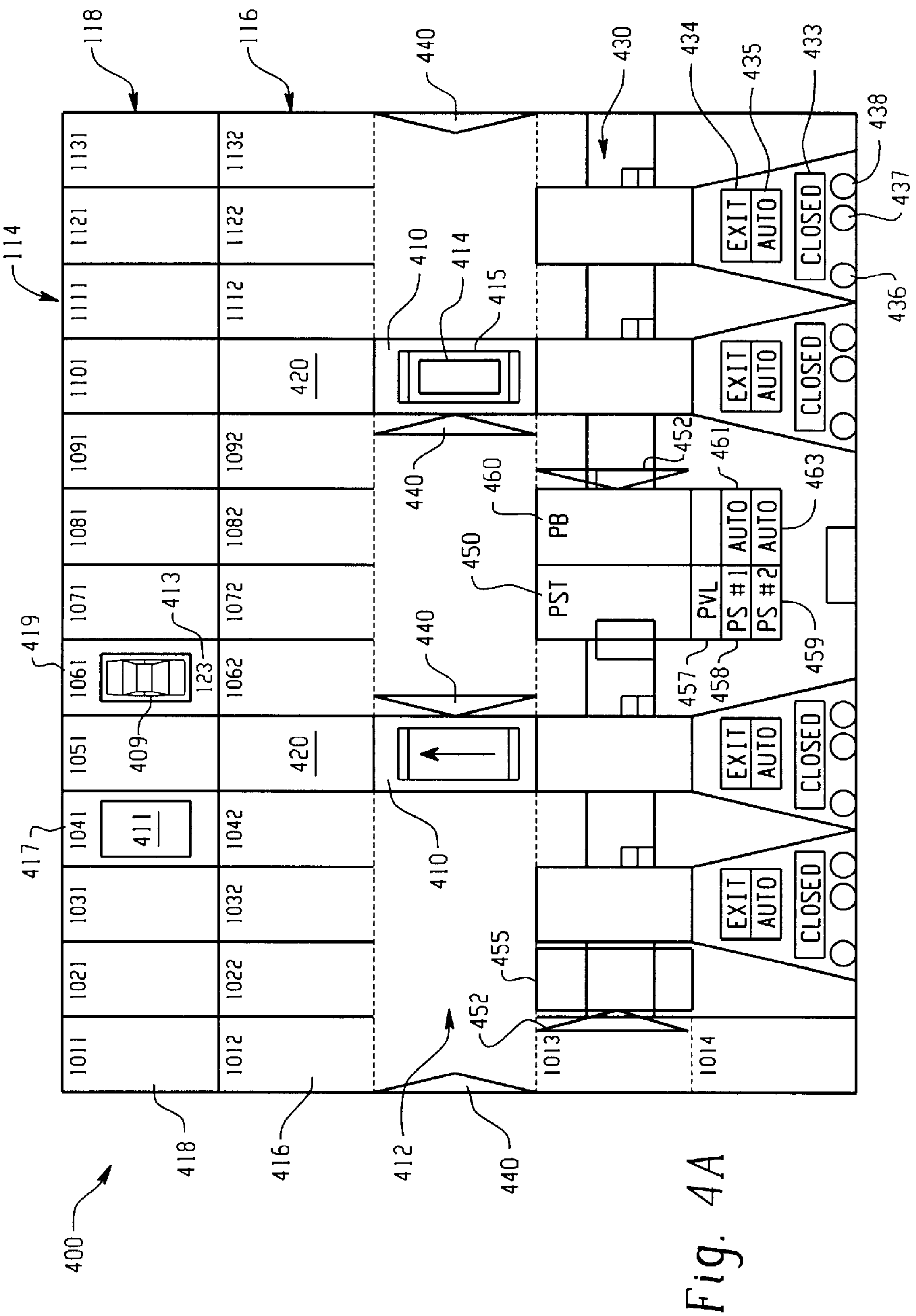
FIGS. 4A–4F illustrate a computer screen display of the first floor display area of the main control window of FIG. 2.

Referring now to FIG. 4A, there is illustrated a more detailed view of the first floor display area 400 of the Main Control window 200 of FIGS. 2A–C. As shown, the first floor display area 400 includes not only the graphical objects representing actual physical components of the garage 100, but also the status of certain components, and the general contents of the garage 100. The interior racks 116 and exterior racks 118 of storage slots 114 of FIG. 1 are all represented in the display area 400, with each interior rack 116 and exterior rack 118 being assigned a unique identification number.

Note however, that the number of objects, and graphical layout can be suitably adjusted to accommodate greater display resolutions such that more storage slots can be viewed, and a greater number of monitor and control objects can also be provided for monitor and control thereof. For example, a fifteen-inch monitor may provide a limited capability for viewing a window (e.g., 800 by 600 pixels), since the operator may find it more difficult to view and interact with the graphics presented thereon. Alternatively, a higher resolution screen (e.g., 1600 by 1200 pixels) on a twenty-one monitor offers more window real estate on which to draw the graphic objects and display monitor and control graphics. Thus larger garage layouts and configurations can be accommodated.

By way of example, an interior rack 416 graphic has been assigned an identification number of "1012", and exterior rack 418 has been assigned an identification number of "1011". The identification numbers may be assigned in any number of ways, but in the present example, the identification number of each storage slot 114 is based on the floor, aisle position and row of each slot 114. The interior rack 416 is on the first floor (represented by the first digit "1"), in the first aisle position (represented by the next two digits "01"), and in the second row (represented by the fourth digit "2").

The contents of each slot 114 are further represented in the display area 400. For example, the exterior rack 418 is empty. As further examples, an exterior rack 417 contains a stack of pallets (denoted as block 411), and an exterior rack 419 contains a loaded pallet icon 409 shown with a vehicle graphic superimposed within a block. Every vehicle handled by the garage system is assigned a unique vehicle identification number 413 that is displayed below the loaded pallet icon 409.

In manual operation, an operator may select an occupied rack, such as exterior rack 419, to command the control program to retrieve a car. In that case, the selected rack 419 is preferably highlighted to indicate that the stored vehicle is queued for retrieval. Likewise, operator selection of an empty rack is interpreted as a command to store a car in the selected rack. When vehicle storage is requested, the rack graphic is highlighted to indicate that the corresponding rack is reserved for vehicle storage.

Like the physical layout of the garage 100, display area 400 includes an aisle display 412 along which carrier module objects 410 traverse (i.e., an LCM 110, since this is the entry level floor, and the UCM for floors other than the entry level floor). The display area 400 also displays the physical status and contents of the carrier modules 110 through each corresponding carrier module object 410. The GUI shows animated real-time movements of all machine components installed in the garage storage facility 100.

When the carrier module 110 is in motion, limit markers 440 are used to define and indicate the range of motion. In manual mode, the limit markers 440 may be dragged left or right in the aisle display graphic 412 by an operator using a pointing device (e.g., a mouse, light pen, etc.) operatively connected to the control computer to limit the actual working range of the carrier module equipment 110 along the aisle 112. The contents of the carrier module 110 and the status of an associated REM are depicted via a REM indicator 415.

Respective VLC objects 420 may depict each VLC 120 on the various floors, such that the VLC 120 is being represented graphically on each floor presented on the display. The EES 130 of FIG. 1 are depicted as a group of EES objects 430, including several status objects that identify the status of the respective EES 130. Display color can be used to represent different operating modes. For example, when the garage 100 is operating in automatic mode, the background color is yellow, and when the garage 100 is operating in manual mode, the background color is red.

The open/close status of the exterior garage door 131 of the EES 130 of FIG. 1 is represented graphically by an EES exterior door indicator 433 of the first floor display area 400. The EES door indicator 433 displays text indicating a status of Open, Closed or in transition between the open and closed position. The flow of traffic of each EES 130 is also controlled and includes an associated status display 434 associated with the respective EES object 430. Each EES 130 may be programmed to receive or release vehicles, and thus the EES status indicator 434 displays the text "enter" or "exit" accordingly to the respective traffic flow. Further, each EES 130 may be individually programmed to operate automatically or manually, and the relevant operating mode status object 435 provides control as either in "auto" or "manual" mode, respectively.

Each EES 130 is further equipped with a message presentation system instructing and alerting the driver through visual and auditory cues. The messaging system includes one or more marquees for presenting messages to the patron when in the EES 130. The messages are presented in response to signals received into the control computer by numerous sensors located at various locations in the garage 100. Note that the messaging system can include the audio capability in conjunction with colored lighting or indicators, and many other conventional messaging and indicator techniques for instructing the customer.

Each EES 130 includes dimensioning equipment for vehicle or item preprocessing to ensure that each vehicle that initially enters the EES 130 fits within a predefined envelope. This is to be certain that the vehicle can actually fit into the garage structure and system for storing and retrieval. Thus the equipment measures the length, width, and height of each vehicle entering the garage 100 to determine whether the vehicle meets predetermined criteria before storing in the garage 100. For vehicles or items that do not exceed the envelope criteria, but are suitable for storing in the garage 100, the patron is further instructed via the messaging system to take further steps for preparing for storage. Alternatively, if the vehicle dimensions exceed the criteria, the patron is not allowed to park the vehicle in the garage 100. Accordingly, the messaging system is utilized to notify the patron of the failure of the vehicle to meet the criteria, and that the vehicle is not allowed to be parked in the garage 100, and should be removed.

The EES 130 also includes a positioning and guidance system that aids the vehicle driver in parking the vehicle on the empty pallet of the EES 130. Signals and messages associated with the positioning and guidance system are presented to the operator via the GUI and the driver via the marquee messaging system. Examples of such messages presented to the driver, and displayed to the operator include, but are not limited to: "Pull Forward", "Proceed Slowly Until Red Light", "Set Brake, Exit Car, Swipe", "Doors Closing-Stand Clear", "Move Left", "Move Right", "Car Over Height", "Car Over Width", "Car Over Length", "Too Far Forward-Pull Back", "Not in Position-Please Re-Park", etc.

The vehicle preprocessing equipment also includes an imaging system that captures images of the vehicle or item from various angles after it has been determined that the vehicle dimensions indicate the vehicle is suitable for storing in the garage 100. The images capture the condition of the vehicle at the time it was brought into the garage system providing proof that pre-existing scratches or damage to the vehicle cannot be assessed against the garage owner.

Additionally, certain areas of the garage 100 are outfitted with motion and live body detectors to detect motion of persons and equipment in order to avoid personal injury. Each EES 130 of the physical garage 100 also preferably includes three standard traffic indicators. Objects representing each of these indicators are also included in the depiction of respective EES objects 430 on the display area 400. Traffic indicators 436, 437, and 438 are red, yellow and green indicators, respectively, representing stop, soon to stop, and forward movement.

The garage 100 includes hardware for buffering pallets, and performs a method of buffering the pallets using the associated hardware, as described in U.S. patent application Ser. No. 09/364,934. Accordingly, the operation of the pallet buffering method is also depicted graphically in the display area 400. The display area 400 includes a pallet stack object 450, a pallet buffer object 460, and a pallet shuttle object 455. The pallet shuttle object 455 represents the pallet shuttle equipment (not shown) and moves between the pallet stack 450, pallet buffer 460 and any of the EES 430 to manage the supply of pallets according to the pallet stacking and delivery method employed in the garage 100. Pallet shuttle limit markers 452 indicate the range of motion of pallet shuttle object 455 for the current command. The shuttle limit markers 452 can be manipulated manually by the operator to define the limits at a particular time, e.g., maintenance and testing, and also move in response to preprogrammed settings for the range of movement of the shuttle equipment. Note that all of the transport machines of the garage 100 utilized for transporting a loaded or unloaded pallet, including the carriers (i.e., UCM and LCM), have graphics and associated limit markers. The limit markers are set into auto mode automatically by the program, and in semiautomatic or manual mode by the operator.

The pallet stack object 450 (denoted PST) has associated therewith a pallet vertical lift (PVL) indicator 457, a first pallet shuttle button 458 (denoted PS #1) for causing a first pallet shuttle window to open when the corresponding mode indicator 461 is in "semi-auto" mode, and a second pallet shuttle button 459 (denoted PS #2) for causing a second pallet shuttle window to open when the corresponding mode indicator 463 is in "semi-auto" mode.

Figure 4B:
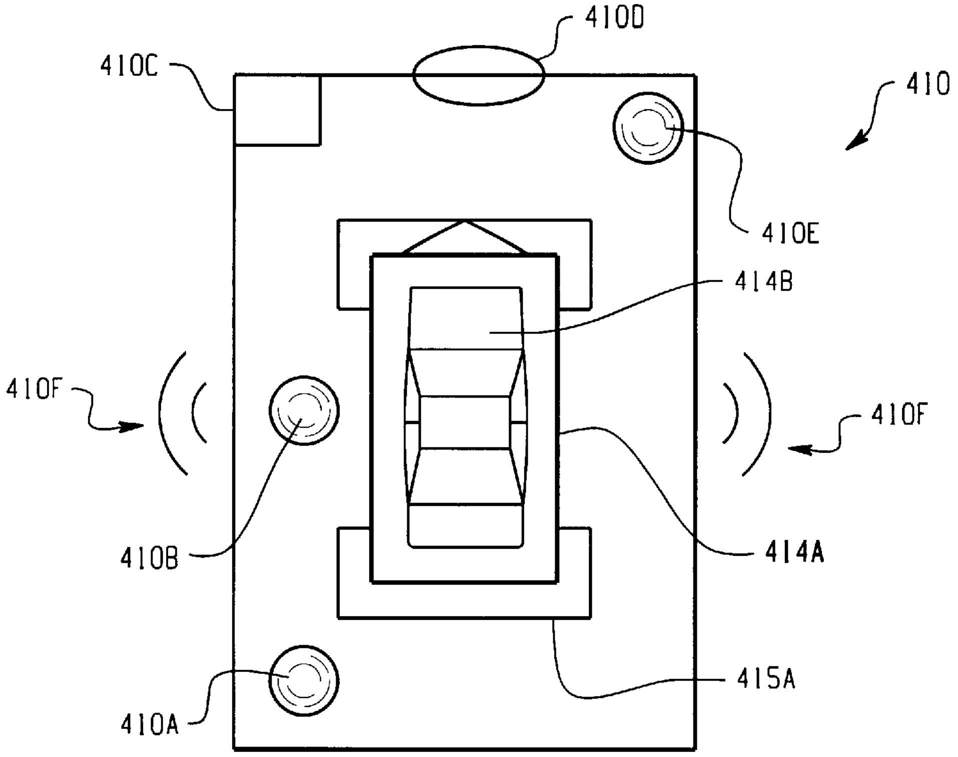

Referring now to FIG. 4B, there is illustrated a more detailed view of the carrier module object 410. The carrier module object 410 is used for both the LCM and UCM components. Each carrier module object 410 includes information for the E-Stop status 410A, REM home status 410B, carrier unit number 410C, VLC detect sensor 410D, and auto ready 410E. The "E-Stop" indicator 410A denotes whether a hard system stop signal has been sent to stop movement and operation of the carrier module 110. The "Home" indicator 410B indicates whether the REM module of the carrier 110 is in a home position. The carrier module unit number 410C is displayed in the upper left comer to identify the carrier module 110 associated with carrier module object 410. The VLC detector status indicator 410D indicates whether a VLC 120 has been detected. In the upper right hand comer, the "Auto-Ready" indicator 410E indicates whether the associated carrier module 110 is ready or in-use when the control program is in placed in "Automatic" mode. Sensor indicators 410F indicate that motion sensors are operating to detect movement of the carrier module 110 as a safety precaution. The background color of carrier module object 410 may be varied accordingly to indicate whether the garage 100 or this particular module is operating in automatic, semi-automatic or manual modes. In manual mode, selecting the carrier module object 410 identifies the operator intention to move the carrier module 110. Subsequent selection of a slot 114 (or interior or exterior rack) causes a signaling of a TRAVEL, GET or PUT command, based on the circumstances.

Note that the indicators described herein with respect to FIG. 4B, and hereinbelow with respect to FIGS. 4C–4F, are examples of how the garage and storage facility can be represented for this embodiment. Other graphical variations and presentations may be used. The flexibility for providing such indicators is limited only by the control and monitor GUI software, such that a fewer or more such indicators can be designed into the graphics according to the application.

A pallet 414A object over which a vehicle icon 414B is imposed illustrates that the pallet is loaded, i.e., containing a vehicle or item on the pallet. The loaded pallet graphic (both pallet 414A and vehicle icon 414B) is placed over a REM object 415A (of FIG. 4C) indicating that the carrier module (e.g., carrier module 110) is currently supporting the loaded pallet.

Figure 4C:
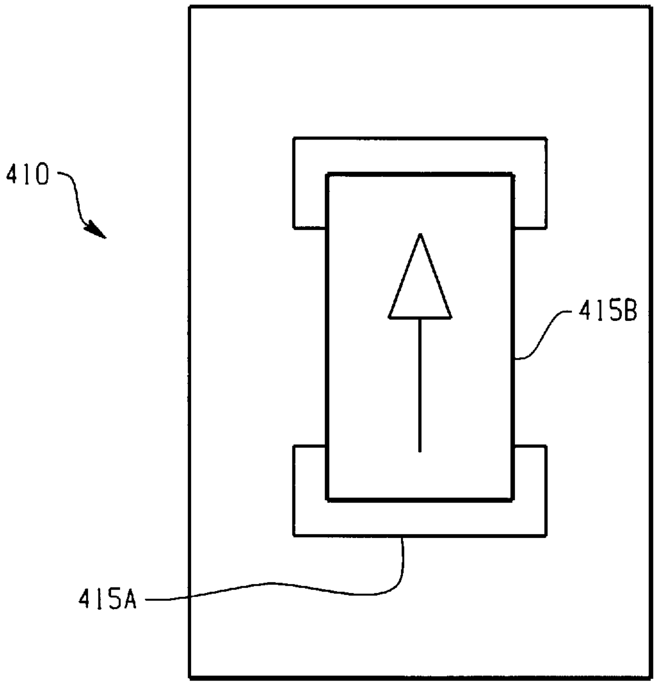

Referring now to FIG. 4C, there is illustrated a REM object 415A graphic when the carrier module 110 is not supporting a pallet or vehicle. Direction of an arrow 415B indicates whether the REM has rotated the supported loaded pallet. If the loaded pallet has been rotated one hundred eighty degrees, the arrow 415B is pointed up. If the loaded pallet has not been rotated, the arrow 415B is pointed down.

Figure 4D:
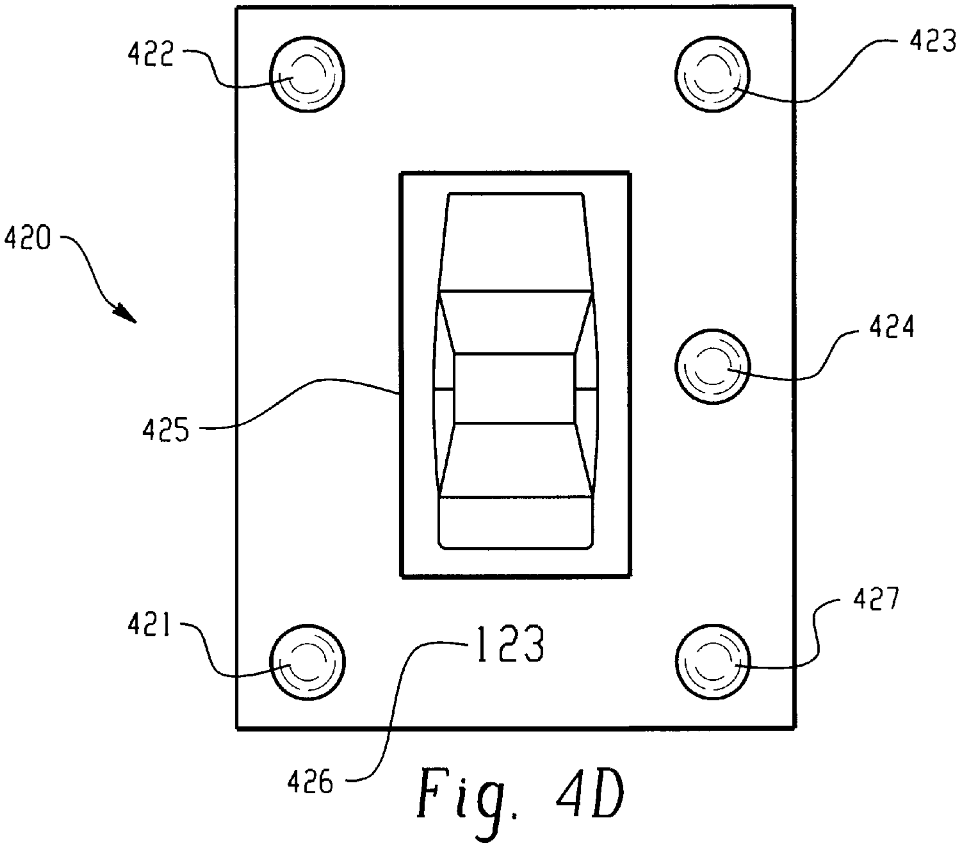

Referring now to FIG. 4D, there is illustrated a more detailed view of a VLC object 420. The display area 400 also includes VLCs objects 420, and EES objects 430 representing the EES 130. Each VLC object 420 includes an E-Stop indicator 421 to indicate whether the conveyor has been affected by an E-Stop request. The VLC icon 420 may also include a unit number 422 to identify the particular VLC 120, an auto-ready indicator 423 to indicate that the unit is ready when the garage 100 is in automatic mode, a "REM In" indicator to indicate when the REM is obstructing vertical movement of the VLC 120 during insertion or removal of the loaded pallet to and from the VLC 120. The VLC object 420 includes a command button 424 that allows an operator to manually request the VLC 120 to move to a specific floor when the garage 100 is operating in a manual or semi-auto mode. For example, an operator wishing to command the VLC 120 to move to the first floor may select button 424 of the VLC object 420 displayed on the first floor display area 400. When appropriate, the VLC icon 420 may show a car and/or pallet representation 425 (similar to loaded pallet graphic 414A and 414B). If a car is present, the vehicle identification number 426 will be displayed.

Figure 4E:
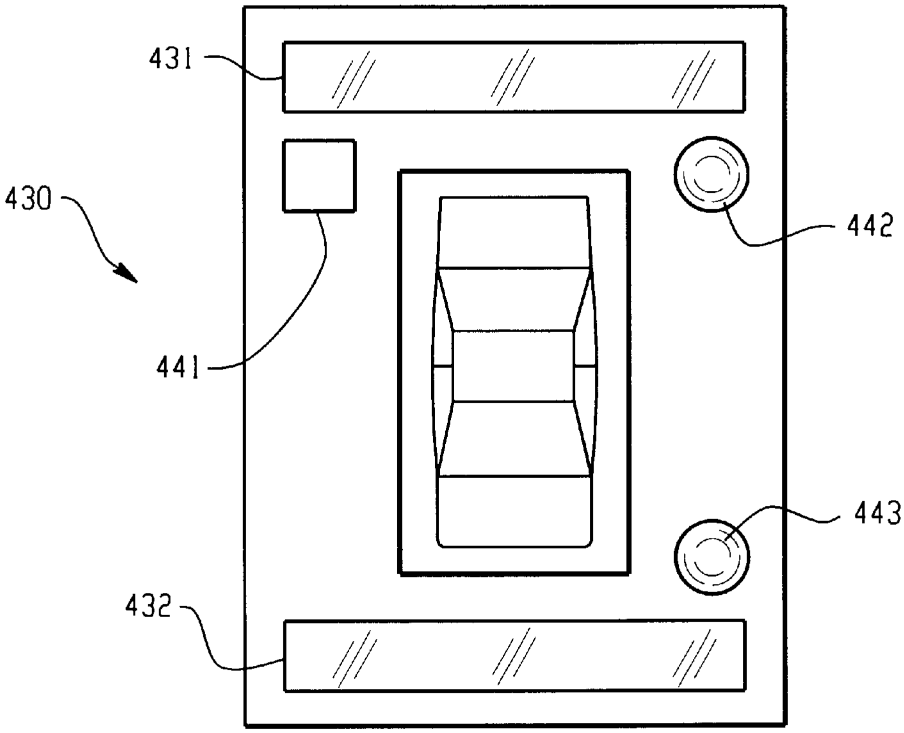

Referring now to FIG. 4E, there is illustrated a more detailed view of an EES object 430. Each EES object 430 includes an interior door color indicator 431 and exterior door color indicator 432 which correspond to the physical doors (133 and 131). When a door is closed, the associated door object (431 or 432) is presented in green. When a door is open the associated door object (431 or 432) is presented in red. When a door is transitional between the open and closed position, the associated door object (431 or 432) is presented in yellow. Operator selection of either door object (431 ro 432) causes the control program to send an OPEN or CLOSE command, as appropriate. Each EES 130 has an assigned unit number depicted at EES unit indicator 441. Each EES 130 includes an "REM In" indicator 442 indicating whether the associated REM is presently extended into the EES 130 to remove a loaded pallet, and a "PS In" indicator 443 to indicate whether the pallet shuttle is in the EES 130 to either remove an unloaded pallet, or to insert an unloaded pallet. Of course, a vehicle and pallet may be displayed, as appropriate, to indicate the presence of a loaded pallet.

Figure 4F:
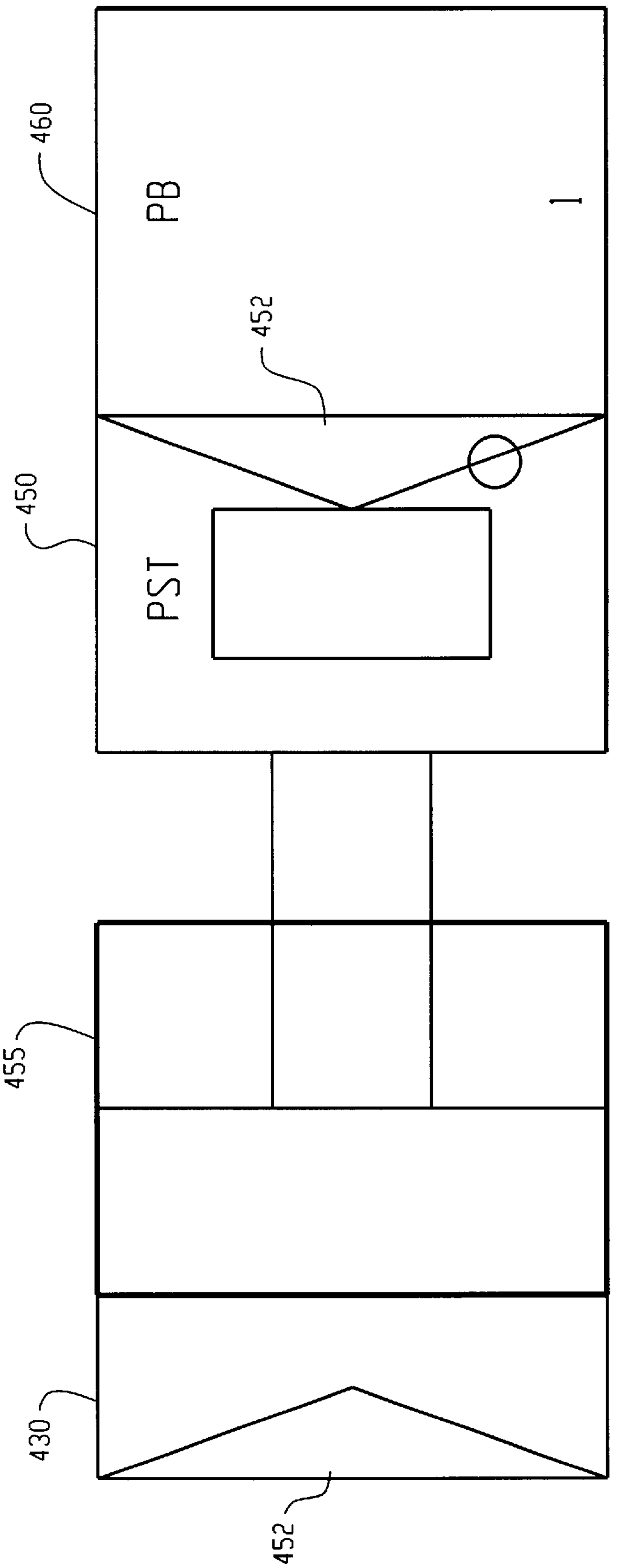

Referring now to FIG. 4F, there is illustrated a graphical representation of the pallet shuttling, stacking, buffering, and delivery components for servicing the EES 130 of the garage 100. As indicated hereinabove with respect to FIG. 4A, the related objects include the pallet stack object 450, the pallet buffer object 460, and the pallet shuttle object 455. The pallet shuttle object 455 represents the pallet shuttle equipment (not shown) and moves between the pallet stack object 450, pallet buffer object 460 and any of the EES objects 430 to manage the supply of pallets according to the pallet stacking and delivery method employed in the garage 100. Pallet shuttle limit markers 452 define the range of motion of the actual pallet shuttle hardware (represented by the pallet shuttle object 455) for the current command.

Every floor of the garage may be represented by the garage control application. According to the preferred embodiment, every floor of the garage 100 is represented in the Main Control window, as shown in FIGS. 2A–2C, although secondary windows could be used in the event the parking garage 100 implementation was larger than that which could be conveniently depicted in a single overall window.

Figure 5:
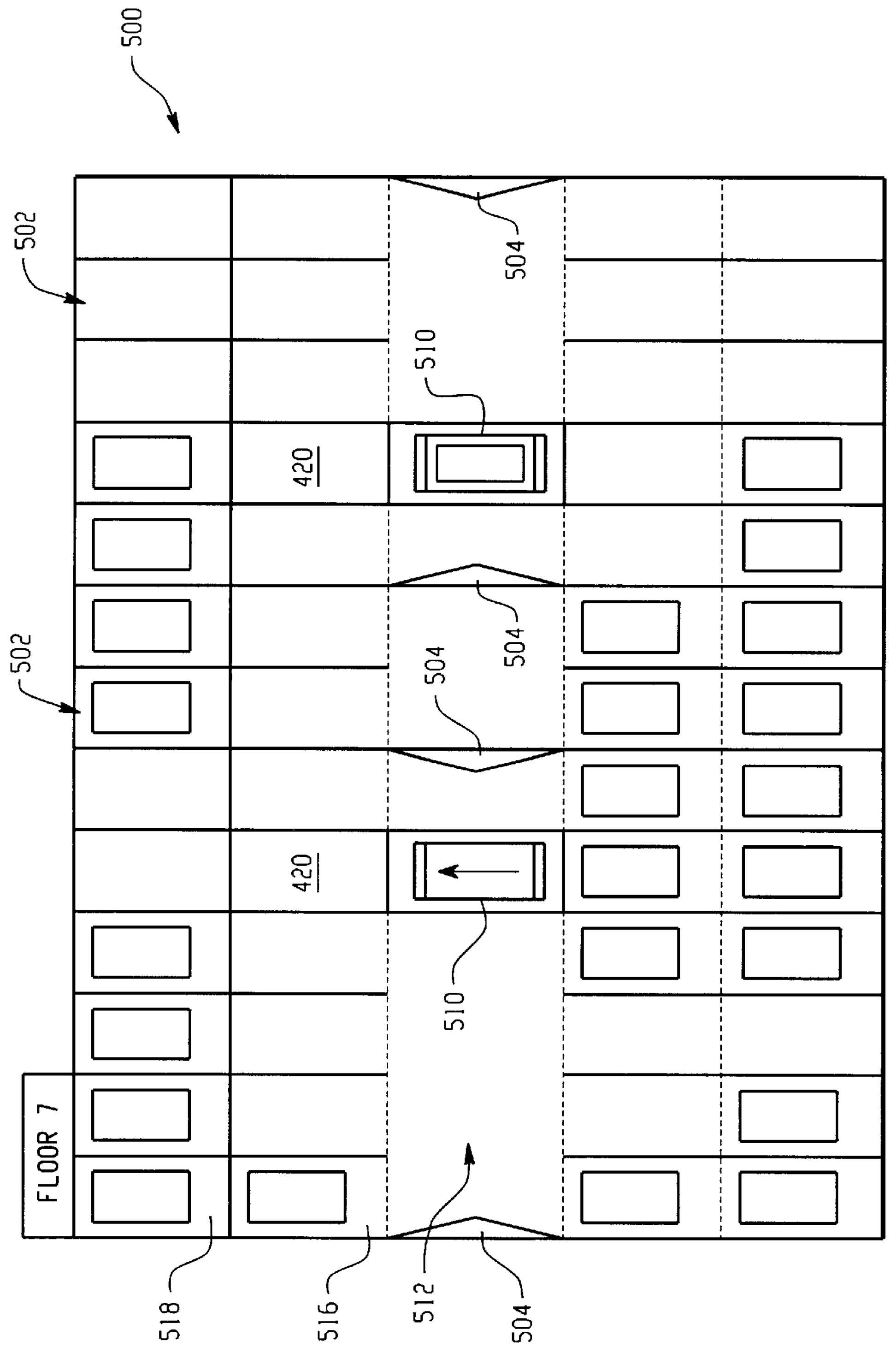
FIG. 5 illustrates a computer screen display of the seventh floor display area of the main control window of FIG. 2.

Referring now to FIG. 5, there is illustrated a more detailed view of the seventh floor display area 500 of the Main Control window of FIG. 2. The seventh floor display area 500 is includes many of the same elements as first floor display area 400, except that it does not include objects related to any EES 130. Unlike the first floor, the seventh floor of the garage 100 does not have direct access to any area outside of the garage 100. As shown, the seventh floor display area 500 includes objects representing an upper floor aisle 512, two upper carrier modules 510 (i.e., UCMs) capable of traversing the aisle 512, a number of storage slots 502 (similar to storage slots 114) including interior racks 516 of an interior row and exterior racks 518 of an outside row, and access to the two VLC 420. In addition, the seventh floor display area 500 includes objects representing the status and contents of the seventh floor of garage 100. For example, aisle limit markers 504 are provided for manual control of the range of movement in the upper aisle 512 for the respective UCM 510.

Figure 6:
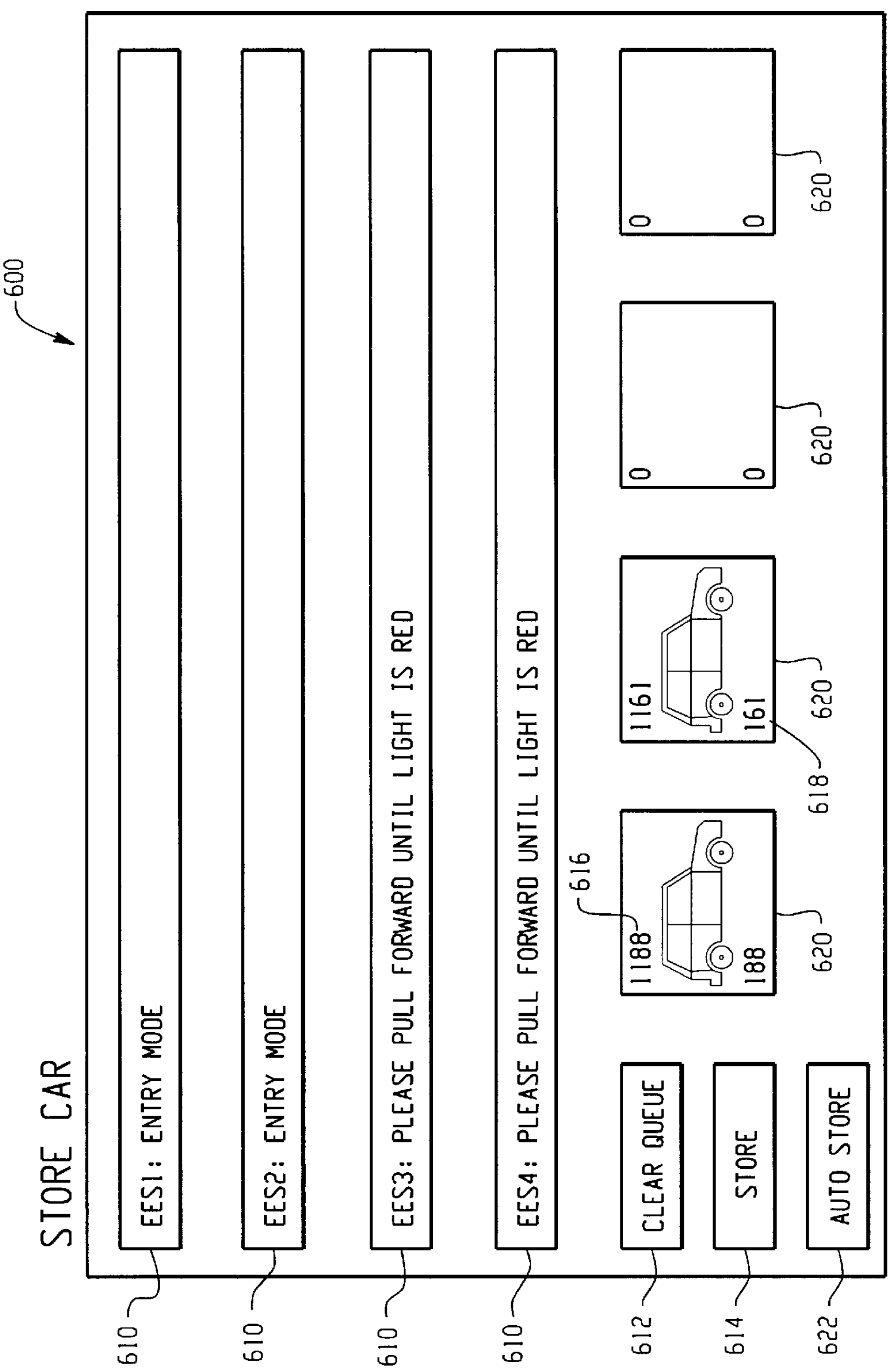
FIG. 6 illustrates a computer screen display of the Store Car panel of the main control window of FIG. 2.

Referring now to FIG. 6, there is illustrated a more detailed view of the Store Car panel 600 of FIG. 2A. The Store Car panel 600 includes four EES marquee indicators 610 that display the textual content of the marquee equipment for each of the four EES 130. Each marquee is part of a messaging service of the control program executed by the control computer to provide instructional information to the driver of the vehicle when in the EES 130. The message service incorporates an interface that utilizes feedback from various sensors including, for example, video cameras, motion sensors and measuring devices. The sensor outputs are received and analyzed by the control program, which the control program processes to determine which instructional messages (and or audio signals) are presented to the driver via the marquee.

The Store Car panel 600 further includes four car queue objects 620. Each car queue object 620 is associated with a vehicle in a respective EES 130 awaiting storage. As shown, two EES 130 have vehicles or items awaiting storage, while the other two EES 130 are empty. The anticipated slot identification number 616 is displayed in the upper left comer of each queue object 620, and the vehicle identifier 618 is displayed in the lower left comer of each object 620. A "Clear Queue" button 612 enables the operator to clear the information displayed in association with a queue of cars waiting in the store queue outside of the garage 100. A "Store" button 614 and "Autostore" button 622 are provided for random and automatic initiation of a corresponding script for selection of a vehicle to be queued for storage. Both the "Store" and "Autostore" objects (614 and 622) can be disabled during normal operations.

Figure 7:
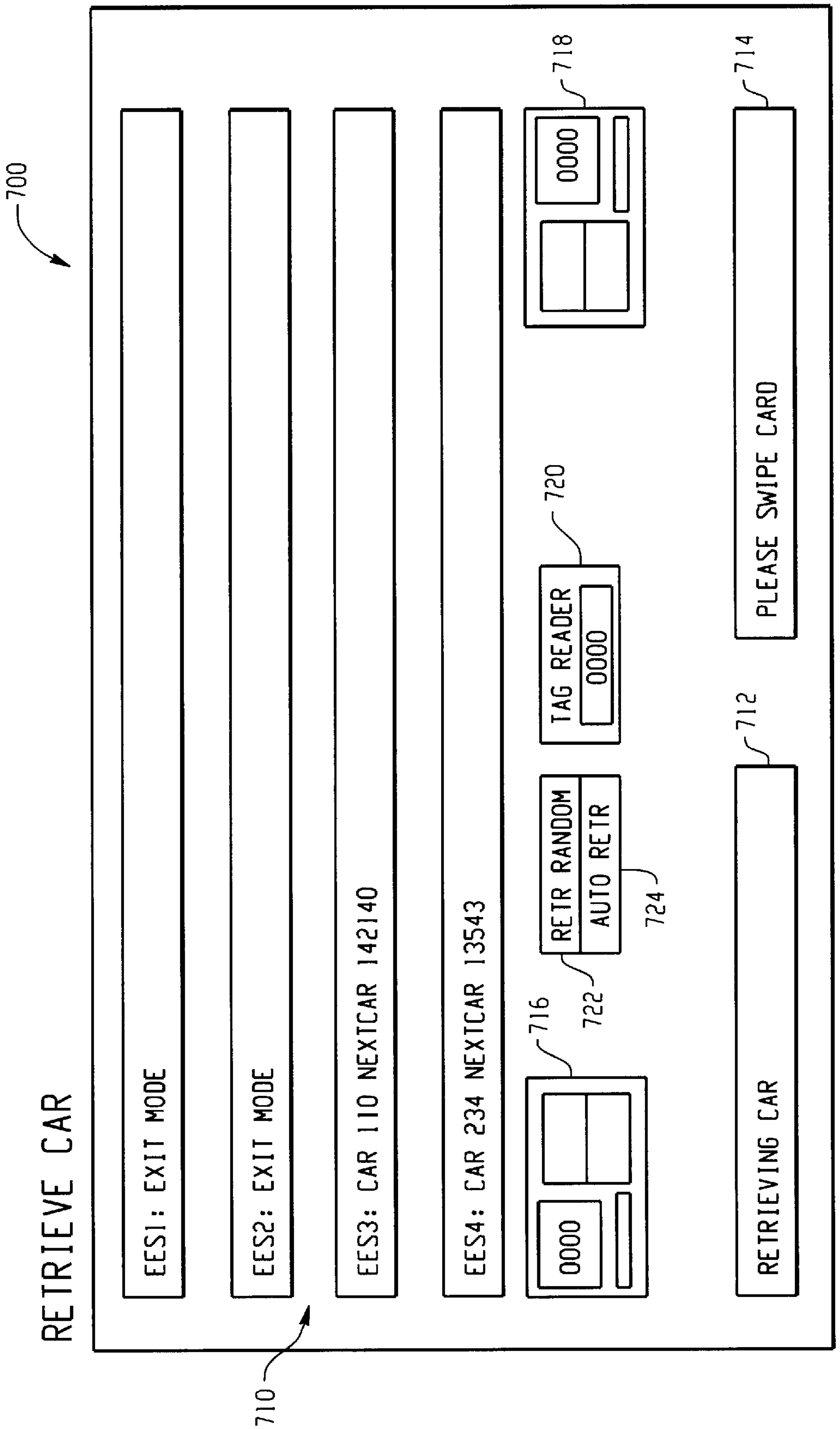
FIG. 7 illustrates a computer screen display of the Retrieve Car panel of the main control window of FIG. 2.

Referring now to FIG. 7, there is illustrated a more detailed view of Retrieve Car panel 700 of FIG. 2A. The Retrieve Car panel 700 includes four marquee text fields 710 associated with the retrieval status of vehicles, one for each EES 130, which present the textual content of the instructional information displayed to the vehicle driver on a marquee in the lobby 124. As with storing of the vehicle, the control program interfaces with the vehicle driver via input means in the lobby 124. The patron requests retrieval of the vehicle via the input means, e.g., a keyboard, tag reader, input pointing device, voice activated data entry, or other conventional means for inputting information to a system. A first display field 712 echoes the status messages displayed to a first patron requesting retrieval of his or her vehicle. The status message indicates when a vehicle is requested and prompts the user to swipe his or her tag (e.g., an RF tag, debit card, Credit Card (CC) or ticket) when a vehicle or item is available for retrieval. A second display field 714 echoes the status messages displayed to a second patron requesting retrieval of the second patron's vehicle.

The availability of the marquees and the user interface for the customer for storing and retrieving a vehicle both provide a mechanism for advertising and/or sending messages to the customer. Thus as with many conventional systems, the mechanism can be suitably adapted to include brief advertisements, promotions, or the like, to a customer when interfacing or viewing the mechanism. Additionally, the messaging mechanism may facilitate a brief user feedback feature wherein one or two short questions are posed to the customer, a response to which is stored in the database, and used to improve garage services, or for other purposes of the garage owner.

The first display field 712 has associated therewith a first keyboard object 716 that displays the keypad information input by the first patron while requesting his or her vehicle from the lobby 124 of the garage 100. The operator can select this keypad object 716 in response to which a screen is opened to allow the operator to input a request (or tag ID)

for a vehicle. The second display field 714 has associated therewith a second keyboard object 718 that monitors the actions of the second patron while requesting his or her vehicle. The operator can select this second keypad object 718 in response to which a screen is opened to allow the operator to input a request (or tag ID) for a vehicle. As indicated, selection of either the keyboard 716 or keyboard 718 by the operator opens a window allowing a vehicle retrieval request to be input.

The Retrieve Car panel 700 also includes a "Tag Reader" object 720 that displays to the operator the vehicle identification number encoded on a patron ticket issued during the storing process. This tag information is displayed in response to the patron swiping the ticket in a card (or tag or CC) reader provided in the lobby 124, as indicated by the instruction provided in the second display field 714. The operator can also select this object in response to which another screen is opened that allows the operator to manually input the tag ID information to initiate retrieval of the associated vehicle.

When storing a vehicle, the storage process associated with the screen of FIG. 6, the customer swipes the tag through the tag reader input device, which triggers the EES exterior door 131 to close. Thereafter machines operate to move the loaded pallet from the EES 130, and place the loaded pallet into the VLC 120. The VLC 120 moves to the designated floor where a carrier of that floor retrieves the loaded pallet from the VLC 120 and inserts it into a predetermined storage slot 114. Note that each EES 130 has a tag reader (or CC reader) associated therewith, e.g., located outside of the corresponding EES 130, for facilitating initiation of the storage process. The Retrieval process is initiated from the lobby 124 via the one or more tag readers.

The Retrieve Car panel 700 also includes a "Retr Random" object 722 that when selected triggers a script to generate a random request for a vehicle in the garage 100, and inputs the tag ID. Similarly, an "Auto Retr" object 724, when selected, triggers a script to generate an automatic request for a vehicle in the garage 100. Both the "Auto Retr" and "Retr Random" objects (724 and 722) can be disabled for normal operation.

Figure 8:
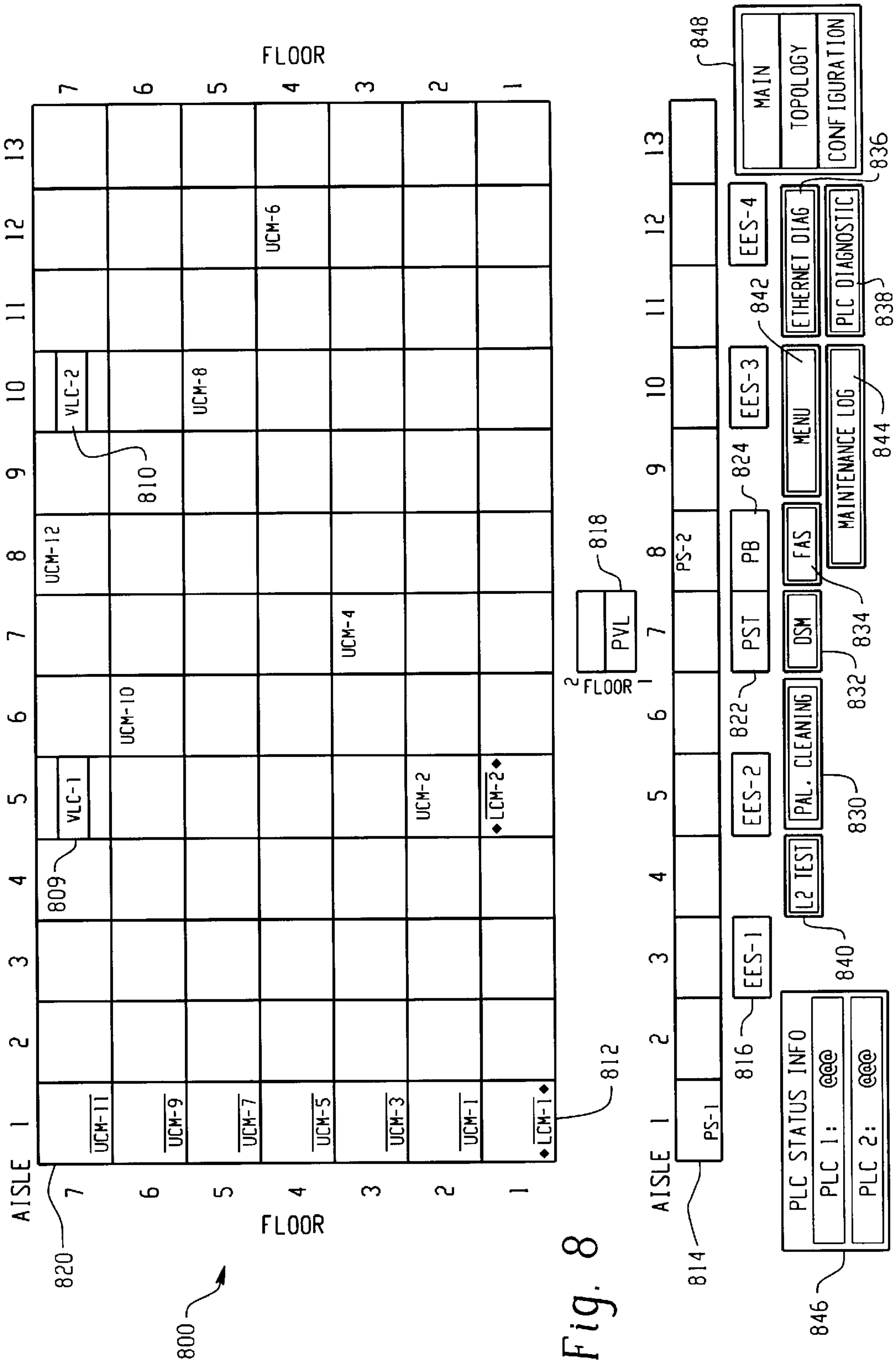
FIG. 8 illustrates a computer screen of a main diagnostic window displayed by a computer controlling the operation of the automated parking garage and storage facility of FIG. 1.

Referring now to FIG. 8, there is illustrated a Main Diagnostic screen 800 that is displayed in response to operator selection of the Diagnostics button 326 from the GCP 300 of FIG. 3. The Main Diagnostic screen 800 enables the operator to review the overall configuration of the garage 100, and receives more detailed diagnostic information regarding specific selectable components. A major portion of the diagnostic screen 800 is arranged to simulate a cross section of the garage 100, with floors being represented along the y-axis, and aisles or rows represented along the x-axis. For example, at reference numeral 809, a first vertical lift conveyor (denoted VLC-1) is shown on the seventh floor in the fifth aisle, and at reference numeral 810, a second vertical lift conveyor (denoted VLC-2) is shown on the seventh floor in the tenth aisle. Thus as the actual VLC hardware 120 is raised or lowered through the floors in the garage 100, the corresponding VLC graphic objects (809 and 810) track the hardware vertical movement to present an accurate status to the operator. Major components of the garage 100 are depicted, for example, at reference numeral 812, a first lower carrier module (denoted LCM-1) is shown in Aisle 1 of Floor 1. An upper carrier module (denoted UCM-11), as indicated by reference numeral 820, is shown in Aisle 1 of Floor 7. Other carrier modules for the floors include a second lower carrier module (denoted LCM-2) that is also shown on the first floor, but currently in alignment with an fifth aisle. Both LCM-1 and LCM-2 graphics (here in text format) move on the screen 800 in relation to movement of the corresponding hardware on the first floor. In this particular illustration, the graphics LCM-1 of the first floor, UCM-1 of the second floor, UCM-3 of the third floor, UCM-5 of the fourth floor, UCM-7 of the fifth floor, UCM-9 of the sixth floor, and UCM-11 of the seventh floor are all in position with the first aisle.

The garage (or storage facility) 100 is implemented with two carrier modules per floor, wherein the second carrier module of each floor is shown at another location corresponding to the actual location of the respective hardware. Thus the second carrier module graphic (UCM-2) of the second floor is aligned with the fifth aisle; the second carrier module graphic (UCM-4) of the third floor is aligned with the seventh aisle; the second carrier module graphic (UCM-6) of the fourth floor is aligned with the twelfth aisle; the second carrier module graphic (UCM-8) of the fifth floor is aligned with the tenth aisle; the second carrier module graphic (UCM-10) of the sixth floor is aligned with the sixth aisle; and, the second carrier module graphic (UCM-12) of the seventh floor is aligned with the eighth aisle. Note that the pair of carrier modules for any given floor, e.g., UCM-9 and UCM-10 of the sixth floor, for the most part have overlapping ranges, however, obviously no two carriers can occupy the same space at the same time. Thus the corresponding text graphics can neither crossover one another, nor reside in the same floor-aisle block at the same time.

Graphic representations associated with the pallet shuttle equipment are depicted in a lower portion of the Main Diagnostic screen 800. For example, at a reference numeral 814, a first pallet shuttle (denoted PS-1) is shown in a position associated with the first aisle. A second pallet shuttle (denoted PS-2) is shown in a position associated the eighth aisle. Note that the EES graphics 816 are positioned according to the location of the actual EES 130 of the general structure of FIG. 1. The first EES 130 is constructed in the third aisle, the second EES 130 is constructed in the fifth aisle, the third EES 130 is constructed in the tenth aisle, and the fourth EES 130 is constructed in the twelfth aisle. In reality, the pallet shuttle hardware, denoted by the respective pallet shuttle graphics (PS-1 and PS-2), operates on a shuttle rail system constructed underneath the many EES 130. However, presenting corresponding graphics for such structural alignment would make the intended status of the pallet shuttle hardware difficult to visualize. Thus the pallet shuttle graphics are displayed in the pallet shuttle area 814. Since the pallet shuttle hardware, which in this case comprises two shuttles, cannot pass around one another on the shuttle rail system, the corresponding pallet shuttle graphics cannot move through one another on the display 800. At a PVL object 818, the position of the PVL is indicated to be on the first floor. However, the PVL can elevate to the second floor to either retrieve a pallet bundle therefrom or transport a pallet bundle thereto. When on the second level, the PVL object 818 will indicate its position.

At the extreme bottom of the Main Diagnostic screen 800, there also are buttons representing the pallet stacker 822, the pallet buffer 824, and a number of buttons enabling an operator to run specific diagnostics on systems of the garage 100. A few of the additional supported diagnostics include pallet cleaning (associated with a "Pal. Cleaning" button 830), and a "DSM" (digital servo module) button 832. Selection of the DSM button 832 presents a screen showing the technical details relating to the servomotor and servo amplifier configurations. A "FAR" button 834 is a definition of the FAR locations in the garage 100; where F=floor number, A=aisle number, and R=row number; an "Ethernet Diag" button 836 for initiating communication diagnostics; a "PLC Diagnostic" button 838 for initiating programmable logic controller diagnostics; an "L2 Test" button 840 for initiating cycle testing, as selected by button 334 of FIG. 3; a "MENU" button 842; a "Maintenance Log" button 844 for accessing and displaying maintenance logs and runtimes of different components of the different modules in the garage; and a "PLC Status Info" object 846 for presenting status information for the PLCs utilized in control and monitor of the systems of the garage 100. An operator graphic 848 allows the operator to navigate to the MAIN window 200, the window 200 that displays the existing topology, and configuration information related to all systems of the garage.

Figure 9A:
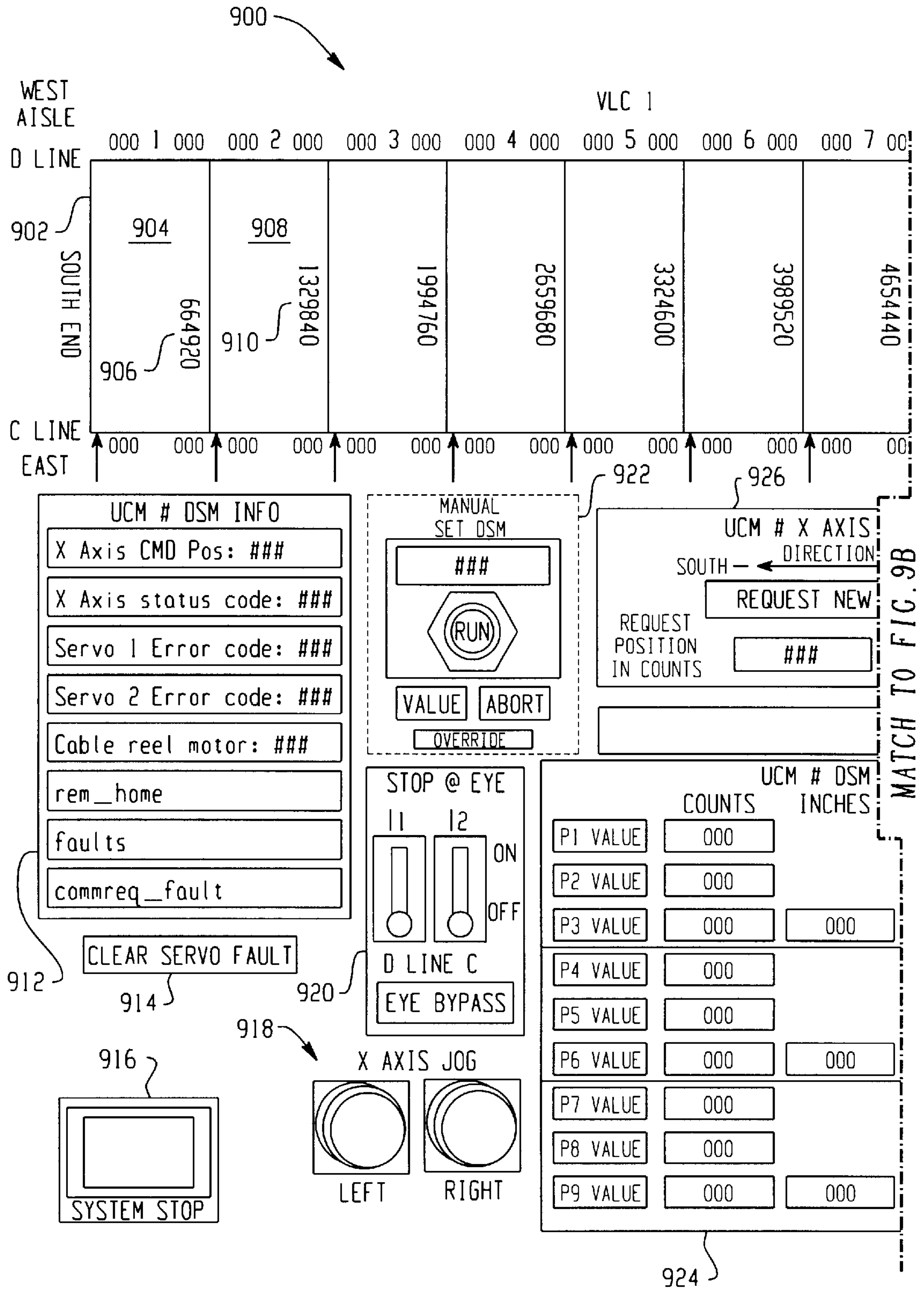
FIG. 9A and FIG. 9B illustrate a computer screen display of an Upper Carrier Module Diagnostic window displayed by a computer controlling the operation of the automated parking garage and storage facility of FIG. 1.
Figure 9B:
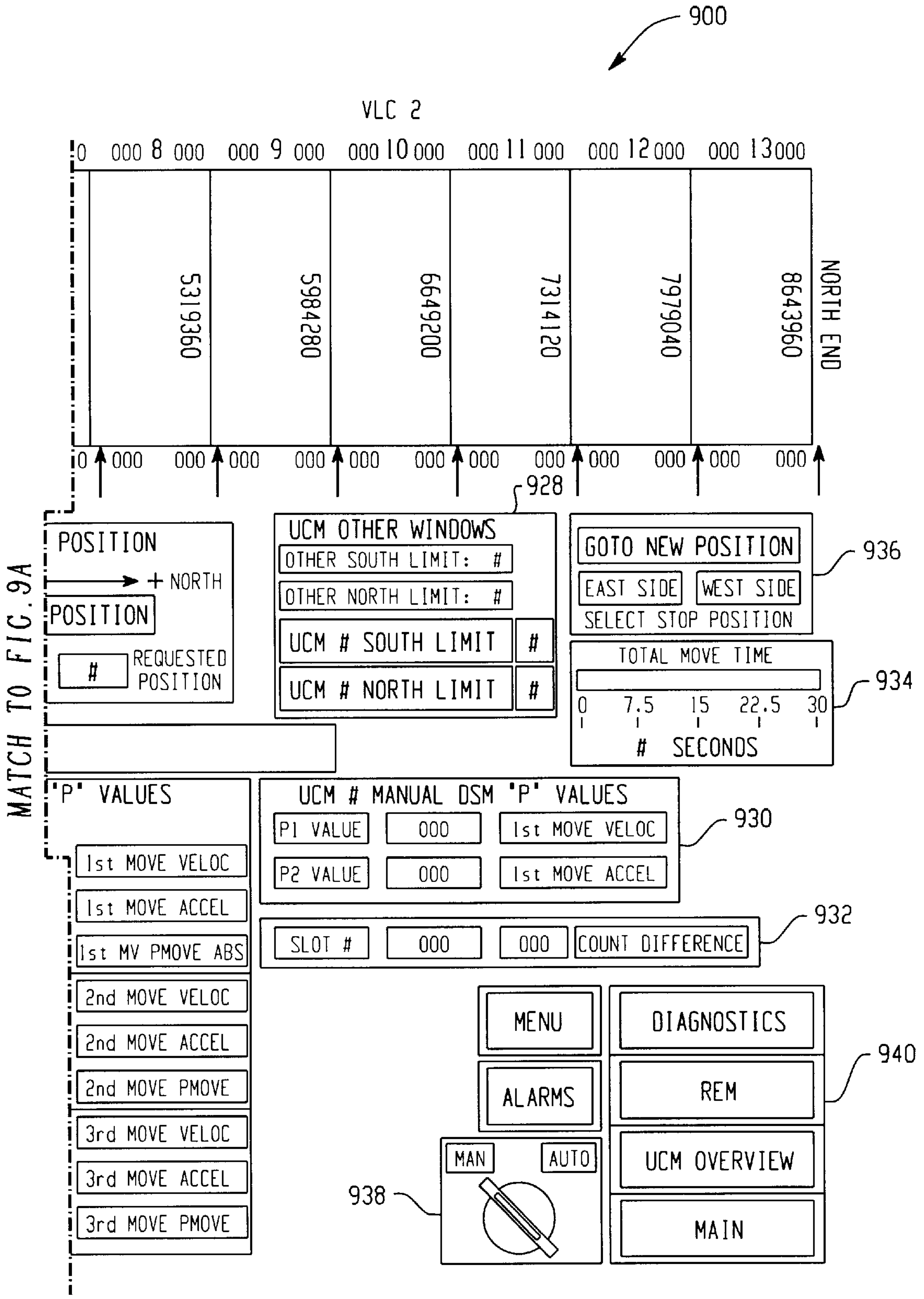

Referring now to FIG. 9A and FIG. 9B, there is illustrated an Upper Carrier Module Diagnostic screen 900. Each graphical element of the garage 100 displayed on the Main Diagnostic screen 800 may be selected for further information. Note that each module shown on screen 800 of FIG. 8 and screen 200 of FIG. 2 has such a detailed diagnostic and manual operation screen. For example, operator selection of UCM-12 associated with reference numeral 820 causes a more detailed screen to be displayed, such as the Upper Carrier Module Diagnostic screen 900. A top row 902 illustrates thirteen storage racks that extend the length of the garage 100, in this particular facility implementation. Other garage implementations may include a lesser or greater number of storage racks. A first storage rack 904 is illustrated with a first index (or count) value 906 of "664920", with each subsequent storage rack 2–13 including an increasing multiple thereof. The first index value 906 defines the linear distance of the furthest edge of the first storage rack 904 from the left end (also denoted "South End"). Similarly, a second rack 908 has associated therewith a second index value 910 of "1329840" which is a multiple of two of the first index value 906. The second index value 910 defines the linear distance of the furthest edge of the second storage rack 908 from the left end (also denoted "South End"). The count values relate to the number of counts in a single rotation of an encoder shaft, e.g., 8000 counts per rotation. Thus numerous rotations place the particular encoder at a linear distance from designated a starting position.

The UCM Diagnostic screen 900 also includes a DSM status graphic 912 that displays DSM information of the respective UCM selected on the Main Diagnostic screen 800 (in this case, UCM-12). The DSM status information includes the x-axis position of the UCM as commanded by the control system, an x-axis status code, a first servo error code, a second servo error code, a cable reel motor value, a rem_home field, a faults field, and a commreq_fault field. A "Clear Servo Fault" button 914 allows the operator to reset the fault condition after it has been resolved or simply at the discretion of the operator. A "System Stop" button 916 allows the operator to immediately stop the UCM from operating. An "X-Axis Jog" control object 918 allows the operator to select either a Left Jog control or a Right Jog control to move the UCM at a jog speed (slow speed) to the left or right, respectively, along the carrier module aisle of the seventh floor.

A carrier insertion graphic 920 (denoted "Stop @ Eye") allows the operator to monitor the status of the carrier moving across a "C Line" and eventually activating a photo-sensor in proximity to the back of the rack 904, which is denoted as a "D Line". The graphic 920 also allows the operator to disable either or both of the "C Line" and "D Line" photo-sensor systems, and to bypass both of the photo-sensors completely by activating an "Eye Bypass" selection.

A manual DSM control object 922 allows the operator to manually set DSM values, and force execution of the value by the DSM. In furtherance thereof, the manual DSM control object 922 includes a value field into which the operator enters a value by selecting a Value button, a Run button for initiating execution of the DSM value, an Abort button for stopping execution of the DSM value, and an Override button for resetting the existing value to the default value.

The UCM Diagnostic screen 900 also includes a DSM "P" Value graphic for monitoring the respective count values for nine "P" values (P1–P9). The "P" value is converted to inches for every third "P" value, i.e., P3, P6, and P9. The "P" values include related information; the P1 Value relates to a first velocity value; the P2 Value relates to a first acceleration value; the P3 Value relates to a first parallel move; the P4 Value relates to a second velocity value; the P5 Value relates to a second acceleration value; the P6 Value relates to a second parallel move value; the P7 Value relates to a third velocity value; the P8 Value relates to a first acceleration value; and, the P9 Value relates to a third parallel move value. These are parameters for the motion profiles of the servomotors of the carrier. Note that each REM has a separate screen for presenting such information, as well. The UCM Diagnostic screen 900 also includes a UCM X-Axis Positioning graphic 926 that allows the operator to semi-automatically position the UCM in the carrier aisle. The positioning graphic 926 includes a Counts field in which the operator inputs the count information, a Position field into which the position number can be entered, and a "Request New Position" button which when selected, the UCM moves according to the counts and position data.

The UCM Diagnostic screen 900 also includes a "UCM Other Windows" graphic 928 that allows the operator to set the South End and North End limits (i.e., the x-axis range) for both of the UCM (UCM-11 and UCM-12) operating along the carrier aisle of the seventh floor.

The UCM Diagnostic screen 900 also includes a "Manual DSM "P" Value" graphic 930 that allows the operator to manually set the P1 and P2 values in counts for the UCM. A "Difference" graphic 932 allows the operator to input differential counts if D-line and C-line counts differ from each other, for example, in case of building structure misalignments between these axes.

The UCM Diagnostic screen 900 also includes a timer graphic 934 that provides a progress bar that relates to the time lapsed for transporting a loaded pallet to or from a slot. A positioning graphic 936 allows the operator to select the East/West position of the loaded pallet in the rack during insertion. In the case of offsets between the C and D-line, the operator needs to indicate which side to position. A Manual/Auto graphic 938 allows the operator to enter manual mode for operation of all parameters input through the Diagnostic screen 900 or automatic mode.

The UCM Diagnostic screen 900 also includes a navigation graphic 940 that allows the operator to select other screens for viewing. For example, another Diagnostics screen, REM screen, UCM Overview screen which pops up a detailed UCM screen showing each single sensor and its status, Main screen, Menu screen, and Alarms screen.

Figure 10:
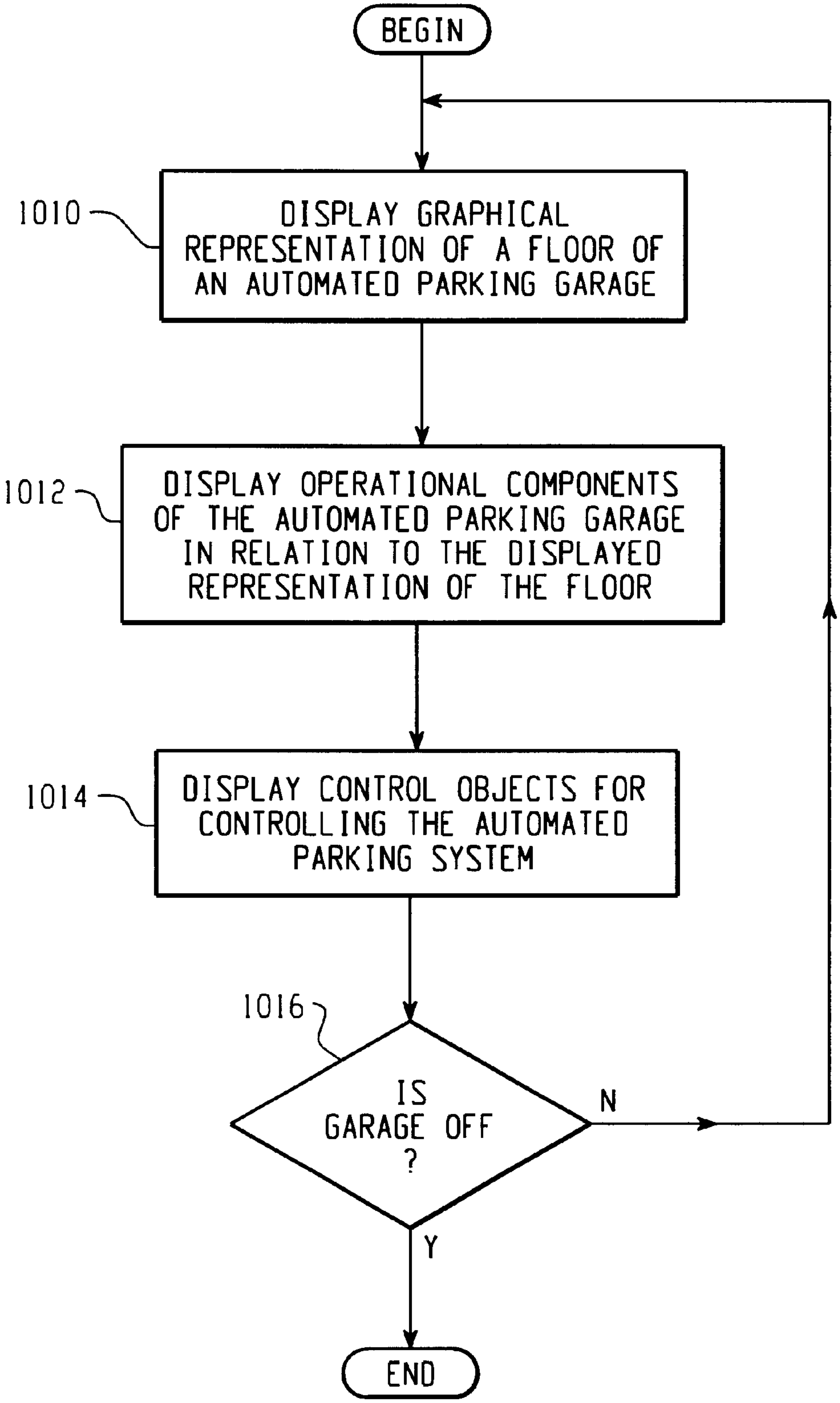
FIG. 10 illustrates a flowchart of the steps performed for displaying graphically components of the automated parking garage and storage facility, according to the present invention.

Referring now to FIG. 10, there is a flowchart illustrating the basic operation of the automated parking garage system. At a step 1010, the garage control application causes the computer to display a graphical representation of a floor of the automated parking garage. In the preferred embodiment, every floor of the automated parking garage is displayed.

At a step 1012, the operational components of the automated parking garage are displayed in relation to the displayed representation of the floor. The operation components of the automated parking garage include the entry/exit stations, carrier modules, rack entry modules, storage racks, pallet vertical lifts and vertical lift conveyors. In summary, all mechanical components needed to perform the storage or retrieval of cars or items in the automated facility are displayed in relation to actuation and/or location on the garage floor. The display of these components provides the operator an accurate representation of the status of the floor of the automated parking garage. Of course, some of these components may also provide control elements to enable the operator to change the status of the component.

At a step 1014, the garage control application displays a plurality of control objects. Each control object is associated with controlling an aspect of the automated parking system. Examples of the control objects include, for example, Manual button 322, Automatic button 324, and Halt-All button 310, described in more detail with reference to FIG. 3. By selecting an object representing a component of the automated parking garage, the operator can change the status of the component associated with the selected object. By selecting a control object, the operator can control the automated parking system according to the function associated with the selected control object. At a step 1016, if the garage is still operating, the control program continues to update the display and poll for input, and program control loops back to block 1012.

Figure 11:
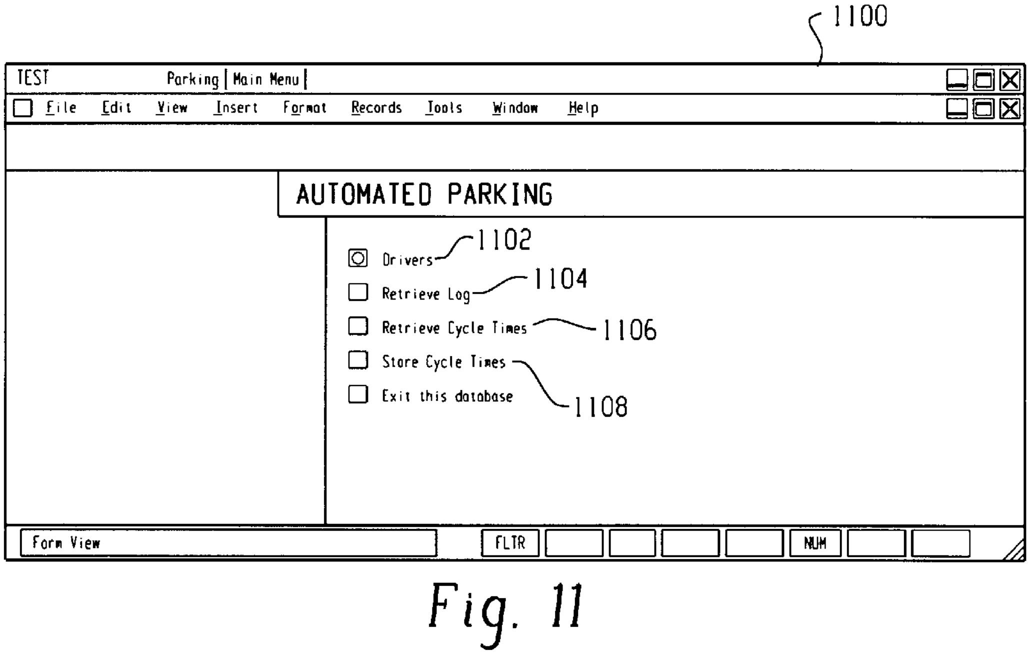
FIG. 11 illustrates a database access screen from which the operator can access stored data.

Referring now to FIG. 11, there is illustrated a database access screen 1100 from which the operator can access stored data. The database, included as part of the control system, stores customer information, logs all store-and-retrieve requests, and logs all service times. From this historical data can be extracted information showing trends of customer usage, garage performance, etc.

The database access screen 1100 includes four primary links to other screens. When selected, a Drivers link 1102 causes a drivers screen (not shown) to be opened from which the operator can view a list of customer information input when the customer transacted to park his or her vehicle in the garage 100. Such driver information includes, for example, but is not limited to, the tag ID assigned to the driver vehicle, time and date of ingress and egress of the EES 130, duration of storage, and any other information the operator may want to include in the database related to driver information. Additionally, if the customer contracts with the garage owner for long-term use of the garage facility, the driver information may include the customer name, address, vehicle make, model license number, and other personal information, such as method of periodic payment, running accounts of the customer, etc.

The database access screen 1100 also includes a Retrieve Log link 1104 which when selected opens a window that presents retrieval information for a specified period of time. For example, the retrieval information may include all associated vehicle and slot information of vehicles retrieved for a certain day, month, etc.

Figure 12:
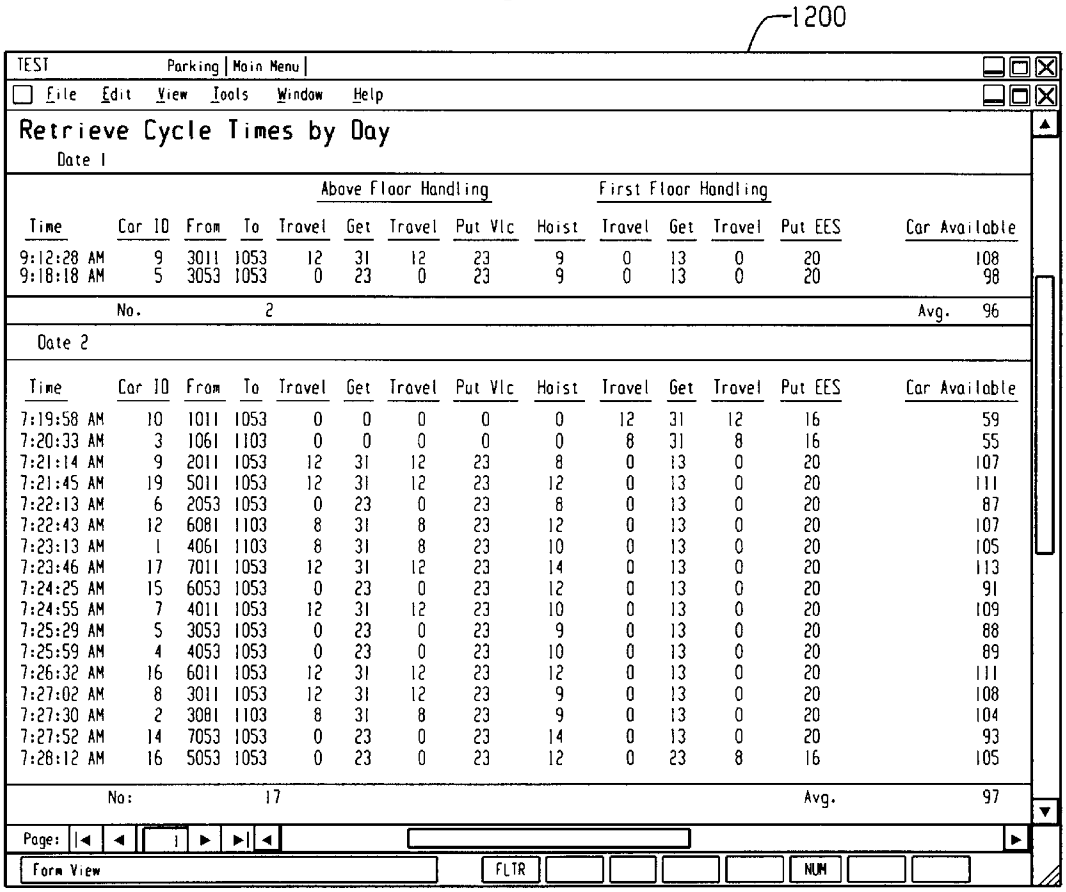
FIG. 12 illustrates a Retrieve Cycle Times screen which is accessed via a Retrieve Cycle Times link of the database access screen.

Referring now to FIG. 12, there is illustrated a Retrieve Cycle Times screen 1200 which is accessed via a Retrieve Cycle Times link 1106 of the database access screen 1100. The Retrieve Cycle Times screen 1200 presents retrieve cycle information for multiple floors of the garage 100, and for a certain period of time, e.g., daily, weekly, monthly, etc. A retrieve cycle time is displayed for each vehicle completely processed during the retrieve cycle. In this particular illustration, the Retrieve Cycle Times screen 1200 shows information on a daily basis. The retrieve cycle time information includes the Date, Time the cycle was initiated, the Car ID of the vehicle involved in the retrieve process, the "From" location time, the "To" location time, and the time information for the non-entry-level floor handling (denoted as the Above Floor Handling) and the entry-level floor handling (denoted as the First Floor Handling). All retrieval time information is in seconds.

The Above Floor Handling information includes the following information: a first "Travel" time, which is the time for the carrier module of that floor to move to the appropriate storage slot to receive the loaded pallet; a "Get" time, which is the time for the carrier module to extend the REM into the storage slot (could be across the empty interior rack to a full exterior rack), support the loaded pallet, and retrieve the loaded pallet from the storage slot to the carrier module; a second "Travel" time, which is the time for the loaded carrier module to transport the loaded pallet to a VLC 120 for transport to the entry-level floor; a "Put V1c" time, which is the time for the upper carrier module to insert and release the loaded pallet into the VLC 120; and a "Hoist" time, which is the time expended by the VLC 120 for lowering the loaded pallet to the entry-level floor.

The First Floor Handling information includes the following information: a first "Travel" time, which is the time for the lower carrier module of the first floor to move to the appropriate VLC 120; a "Get" time, which is the time for the lower carrier module to extend the REM into the VLC 120, support the loaded pallet, and retrieve the loaded pallet from the VLC 120 to the lower carrier module; a second "Travel" time, which is the time for the loaded lower carrier module to transport the loaded pallet from the VLC 120 to an EES 130 of the entry-level floor; and, a "Put EES" time, which is the time for the lower carrier module to insert and release the loaded pallet into the EES 130.

A "Car Available" time is the total time expended for retrieving the stored vehicle from the associated storage rack, and includes the sum of the Above Floor Handling Get time, second Travel time, Put Vic time, Hoist time, and First Floor Handling parameter times of Travel, Get, Travel, and Put EES.

Figure 13:
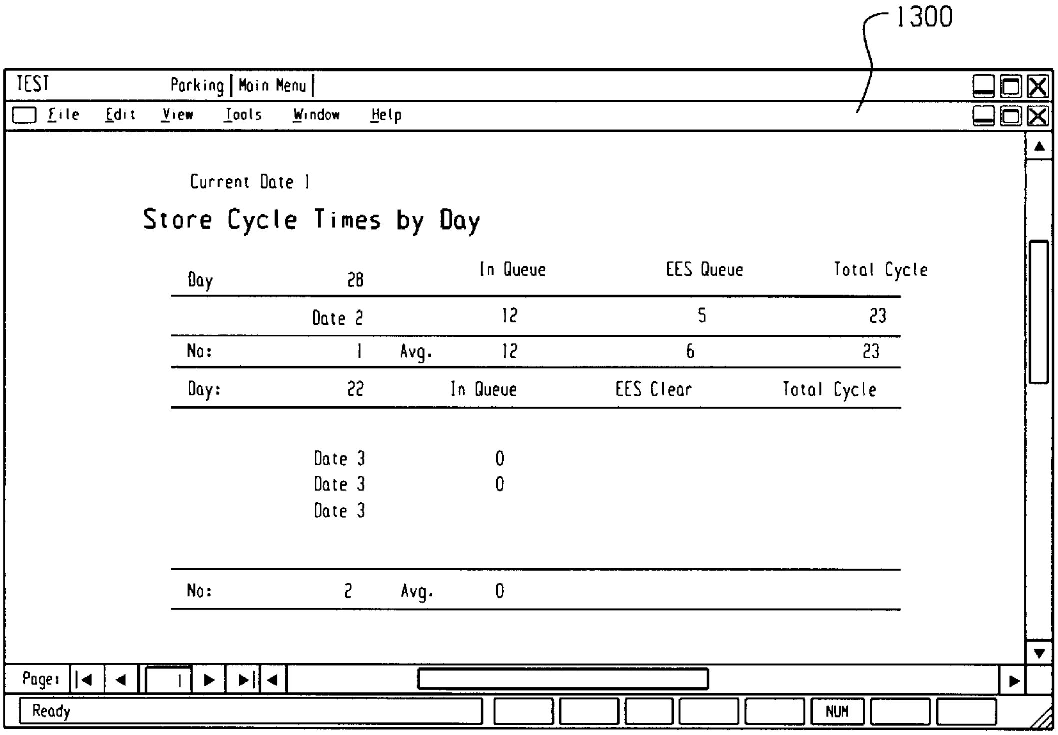
FIG. 13 illustrates a Store Cycle Times screen which is accessed via a Store Cycle Times link of the database access screen.

Referring now to FIG. 13, there is illustrated a Store Cycle Times screen 1300 which is accessed via a Store Cycle Times link 1108 of the database access screen 1100. The Store Cycle Times screen 1300 is a report showing the elapsed time for an EES 130 to get ready to receive a vehicle and the total cycle time to store the vehicle. In this particular illustration, the cycle times are reported by day. Other time periods may be requested, e.g., by week, month, etc., where such a report is deemed useful.

Figure 14:
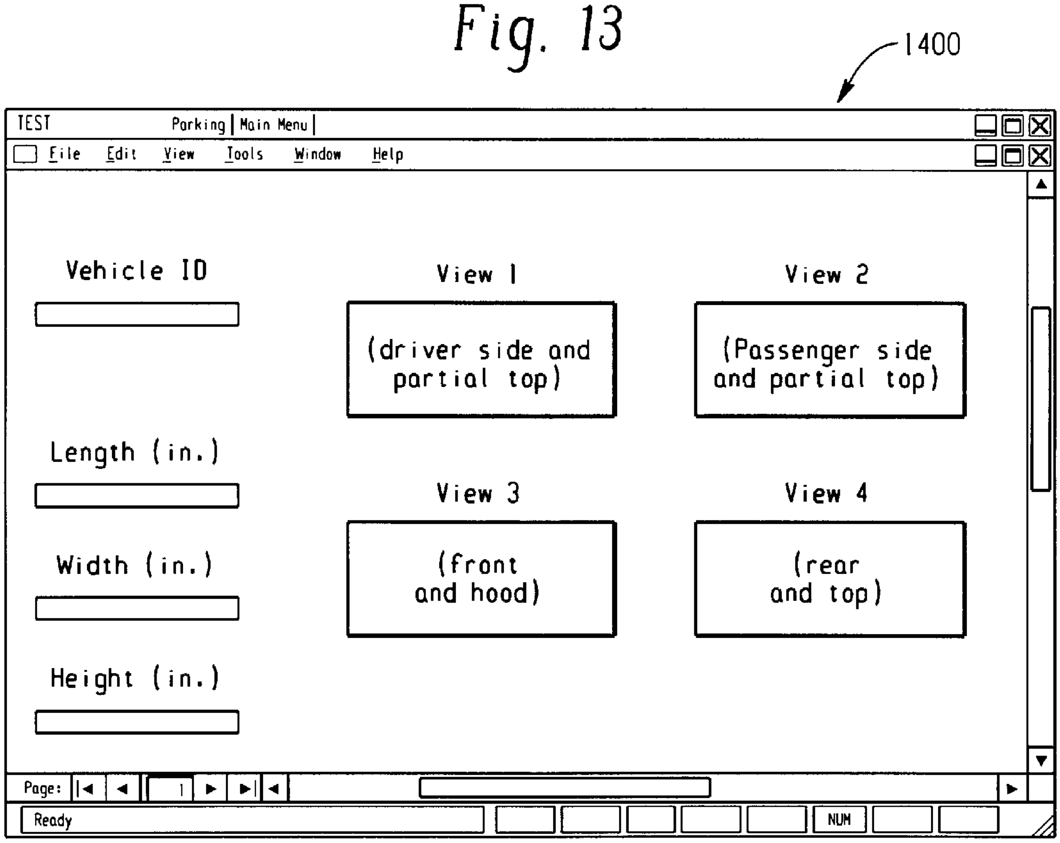
FIG. 14 illustrates a dimensioning and imaging screen utilized for presenting such data captured when a vehicle enters the EES of the garage.

Referring now to FIG. 14, there is illustrated a general dimensioning and imaging screen 1400 utilized for presenting such data captured when a vehicle enters the EES 130 of the garage 100. As mentioned hereinabove, the dimensioning and imaging system performs several functions. The dimensioning system electronically measures the vehicle envelope to ensure the vehicle length, height, and width fit within the criteria for storage and transportation in the garage systems. The dimensioning system can use conventional sensor technologies including, but not limited to, photo-sensors, sonic sensors, etc., to ascertain the required dimensional parameters.

The imaging system includes several cameras strategically located within the EES 130 to capture the vehicle in the format of images from several different angles. In one aspect, this is for the purpose of evidencing the condition of the car when entering the garage so that a customer cannot later allege vehicle damage introduced by the garage systems. The dimensioning process occurs in response to the customer driving the vehicle (or depositing the item to be stored) into the EES 130, and positioning it correctly with the help of the marquee messages (initiated by the various positioning sensors) such that if the dimensions exceed predetermined criteria, the customer is notified that his her vehicle can not be parked in the garage 100, and that it must be removed from the EES 130. Alternatively, the dimension process can occur once the control computer has received data from sensors in the EES 130 that indicate the customer has left the EES 130. In this case, the customer can be notified by the messaging system via the marquee or the automated teller interface that the vehicle will not be allowed into the parking garage 100. The imaging process occurs after the dimensioning process is complete, since it would not be necessary to allocate imaging resources of the control computer if the vehicle is rejected because of its dimensions.

The vehicle dimensions are also presented to the operator in the form of three fields that indicate the vehicle length, width, and height. In order to uniquely identify the vehicle dimension data, the vehicle ID is also displayed in a Vehicle ID field. Of course, more or less information may be displayed according to the particular application and implementation.

In furtherance thereof, the dimensioning and imaging screen 1400 can be accessed by the operator to retrieve from the database historical data of a vehicle that was once processed into the automated garage 100. Additionally, the operator can view the results of the process in substantially real time as the system reports the data back to the control system. Thus, in this particular embodiment, the imaging portion includes four different views: a first view (View 1) that may capture an image of the driver side of the vehicle and if the camera is elevated above the top of the vehicle, a partial portion of the top of the vehicle above the driver side; a second view (View 2) that may capture an image of the passenger side of the vehicle and if the camera is elevated above the top of the vehicle, a partial portion of the top of the vehicle above the passenger side; a third view (View 3) that may capture an image of the front and hood of the vehicle and if the camera is elevated above the top of the vehicle, a partial portion of the top front of the vehicle; and, a fourth view (View 4) that may capture an image of the rear and top of the vehicle and, if the camera is elevated above the top of the vehicle, a partial portion of the top of the vehicle above the rear.

Figure 15:
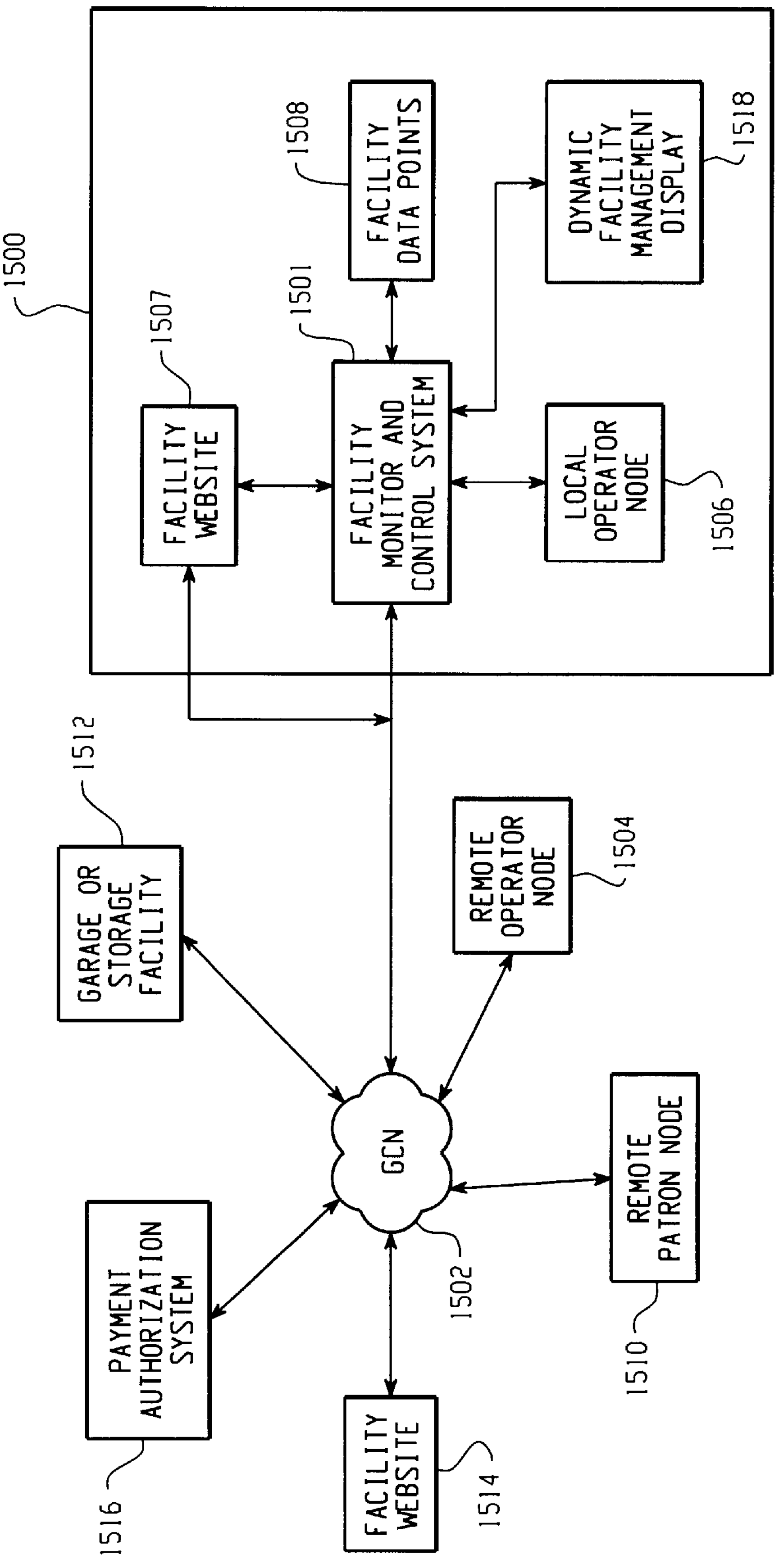
FIG. 15 illustrates a system block diagram via which the garage and storage facility system can be monitored and controlled.

Referring now to FIG. 15, there is illustrated a network block diagram via which the parking and storage facility management system can be accessed. The garage (or facility) management system 1500 can be accessed remotely over a wired and/or wireless network (e.g., a global communication network (GCN) 1502 such as the Internet) wherein an operator at a remote operator 1504 can access and review the same facility system information provided to the operator at a local operator node 1506. In this particular embodiment, the facility management system 1500 includes, but is not limited to, a facility monitor and control system 1501, a local operator node 1506 for interfacing via the interactive interface to all aspects of the management system 1500, a local facility website 1507 for providing limited outside access to the facility management system features, a number of data points 1508 that facilitate monitor and control of the facility components (e.g., sensors, cameras, facility equipment components, messaging and notification systems, or any device or system suitable for making measurements and/or communicating information), and the interactive interface software for providing interactivity with the management system 1500.

For example, the management system 1500 interfaces to data acquisition devices such as video cameras that are strategically placed throughout the garage 100 wherein the facility operator at the local operator node 1506 and/or remote operator node 1504 can access the camera images via the GCN 1502 or the local network. In more robust implementations, communication for the receipt of selected parameters or system information can be obtained, for example, via a cell phone display, paging devices, personal data assistants, or other user interface devices that facilitate communication with a network.

The management system 1500 also provides the capability of presenting parking and storage facility information to the local facility website 1507 which is being accessed by a patron at the facility 100 or from a remote patron node 1510 disposed on the GCN 1502. Thus a patron may plan ahead by accessing at any given time the facility website (either local website 1507 or remote website 1514) to obtain updated facility information about the occupancy of the facility 100 (or facility 1512) as well as the parking rate structure. The patron may be seeking to park his or her vehicle in the facility 100, but by first accessing the facility website 1507, he or she can determine if there is a rack space available for that particular facility. This provides to the patron the capability of reserving rack space in the automated garage 100, to lock in storage at a certain rate, and receiving driving directions to the facility 100.

A payment authorization system 1516 disposed on the GCN 1502 provides payment authorization features such that the patron may provide personal payment information to reserve or secure the desired storage space via the GCN 1502. For example, the payment authorization system 1516 may function to perform a credit check for use with a credit card of the patron. If the patron credit is authorized, authorization signals are then sent to the facility website 1507 for further processing to secure a storage rack for the patron. The patron is then provided with an authorization code or number unique to that transaction. Where a swipe card input device is provided, the patron can reserve storage space by simply swiping the credit card in the device. Once the patron arrives at the facility 100, the patron enters the EES 130 and enters the unique code, in response to which the management system 1500 processes the unique code to initiate storing the patron vehicle or item according to the storage information associated with the remote transaction. Of course, the vehicle or item would need to meet all predetermined dimension criteria before the vehicle could be stored in the garage 100.

The parking service offered via the facility website 1507 (or even a user interface local to the garage 100 that can be accessed by a walk-in or drive-in patron) allows the owner to operate the garage dynamically. The occupancy at any particular moment and the rate structure chosen by the garage owner can be displayed outside of the garage on electronic message centers and/or websites attracting clients with special rates, as desired. In furtherance thereof, and in addition to the facility website 1507, a dynamic facility management display 1518 is provided external to the facility 100. The facility website 1507 can be linked with travel websites such that the patron can make "one stop" reservations to a remote travel location. A patron, whether arriving from a distant location (e.g., from California to the garage 100 located in New Jersey) or a local point (i.e., from within the city in which the garage 100 is located) can secure vehicle parking in the facility 100 by simply completing the website transaction, provided space is available. This capability can increase the occupancy and profitability of the facility for the owner.

Figure 16:
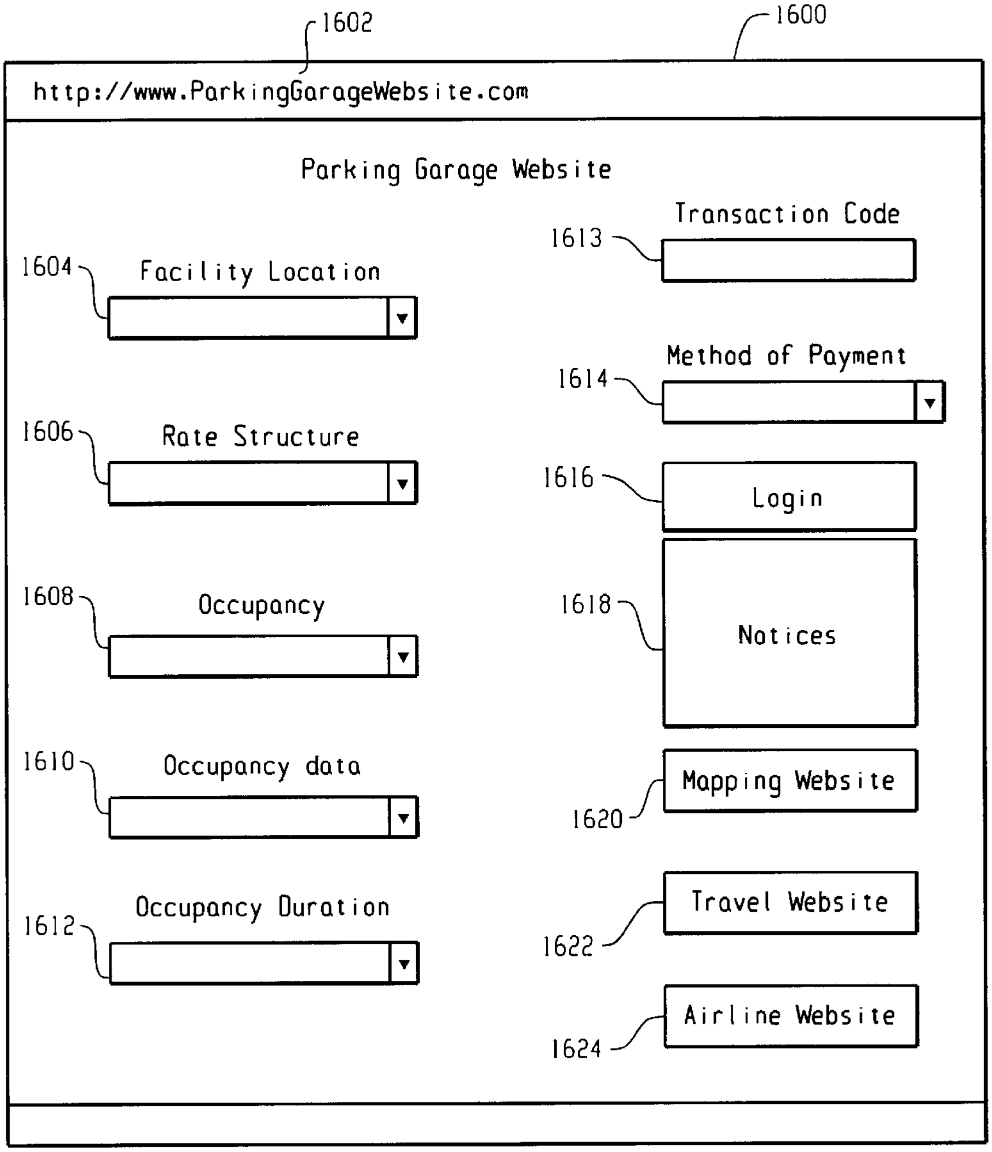
FIG. 16 illustrates an exemplary parking garage and storage facility web page presented to the patron of a remote patron node.

Referring now to FIG. 16, there is illustrated an exemplary parking and storage facility web page 1600 presented to the patron of the remote patron node 1510. The facility website 1507 can be accessed using any conventional browser application by entering a facility website address 1602. The web page 1600 includes a number of selections via which the patron at the remote patron node 1510 can obtain information about occupancy of the facility 100 and conduct a transaction to secure a storage rack. Note also that the garage information and parking transaction can be provided to a remote patron via an automated telephone menuing system or even person-to-person where such implementations are provided.

The web page 1600 can include the following: a Facility Location menu 1604 where the patron can select the location of the garage; a Rate Structure menu 1606 associated with the garage selected in the Facility Selection menu, and from which the patron may select a rate and/or a time to park; an Occupancy menu 1608 for providing a number of available slots, or in more robust implementations, if practical, the option to select a given rack for storage; an Occupancy Date menu 1610 that allows the patron to select a date when the patron will be arriving at the garage 100; an Occupancy Duration menu 1612 for selecting the duration of the vehicle storage at the garage 100; a Transaction Code field 1613 for presenting the unique code to the patron once the transaction is completed; a Method of Payment menu 1614 so the patron may secure the storage rack by making payment (e.g., a credit card) for reservation; a Login selection for those patrons who are subscribers to the automated garage system, whereby the process of logging in may associate special rates and occupancy data to that patron for being a subscriber; a Notices field 1618 where information can be posted to users who browse the website 1514; a Mapping Website hyperlink 1620 that when selected, automatically inserts the selected facility address information such that a map is provided for the patron, or textual instructions for locating the facility 100 (directions to the facility 100 can be made available to the patron at any time during the transaction via any local traffic management system, including GPS (Global Positioning System) wherein the patron GPS system is provided positioning information to locate the facility 100); a Travel Website hyperlink 1622 that when selected opens a web page such that the patron can access travel information; and an Airline Website hyperlink 1624 so that the patron can quickly access airline travel information for traveling to the facility 100 city. A car rental hyperlink from a popular car rental agency website can also link to the garage website where the destination information matches with a city in which the automated garage is located. The number of web pages, method of presenting the information, type and number of hyperlinks, type of information, and menu selections provided by the garage website 1514 is not limited to what has been described, but may be customized for the particular implementation.

The management system 1500 also includes automated vehicle identification capability where a radiofrequency (RF) sensing system as part of the facility data points 1508 located at the facility 100 reads a vehicle tag, e.g., a transponder, mounted in an approaching vehicle thereby enabling hands-free access and processing by the facility monitor and control system 1501. The transponder includes information uniquely associated with the patron, e.g., a user ID, such that the user ID is read from the transponder, retrieved to the control system 1501, and matched to a customer database where customer information is then updated. The customer information includes, but is not limited to, the time, date, and duration of the vehicle storage, type of vehicle stored, and any other information the garage operator deems important for storing. Such RF transponder systems are applied conventionally in tollgate system where a toll road customer that travels the toll road routinely can automate the toll paying process by mounting a transponder on his or her vehicle that can be read automatically as the vehicle passes through the tollgate.

Although this invention has been described in its preferred forms with a certain degree of specificity, it is understood that the present disclosure of the preferred form has been made only by way of example and numerous changes in the details of construction and combination and arrangement of parts may be resorted to without departing from the spirit and scope of the invention.

What is claimed is:

1. A method of managing an automated parking and storage facility using a graphical user interface (GUI), comprising the steps of:

displaying a graphical representation of a floor of the automated parking and storage facility; and presenting a plurality of graphical objects in relation to the floor, thereby representing the state of the floor, the plurality of graphical objects including the representation of an entry/exit station (EES) for ingress and egress of the automated parking and storage facility of a vehicle or item, a transport module for transporting the vehicle or item within the automated parking and storage facility, and a plurality of storage racks for storing the vehicle or item.

2. The method of claim 1, further comprising the step of accessing a database of stored garage and storage facility data via a database access screen of the GUI to view at least one of driver information, retrieve log information, retrieve cycle information, and store cycle information.

3. The method of claim 1, wherein the graphical representation in the step of displaying includes a plurality of floor representations, and each floor representation includes a graphical object that is associated with a system component that operates in at least one of an x-axis direction, a y-axis direction, and a z-axis direction.

4. The method of claim 3, wherein the transport module graphical object is associated with a vertical lift component when the system component operates in the z-axis direction, and with a carrier transport module when the system component operates in at least one of the x-axis direction and the y-axis direction.

5. The method of claim 3, wherein each graphical object has associated therewith unique diagnostic information that is viewable via a diagnostic screen by selecting the respective transport module graphical object.

6. The method of claim 3, wherein the graphical object in the step of presenting has associated therewith boundary limit graphics that allow a user to limit the range of travel of a corresponding system component of the garage and storage facility by positioning via the GUI the boundary limit graphics in relation to the transport module graphical object.

7. The method of claim 1, further comprising the step of automatically moving one graphical object of the plurality of graphical objects in relation to the movement of a system component to which the graphical object is associated.

8. The method of claim 1, further comprising the step of changing the graphical object from a first color to a second color in response to a corresponding change in operating status of an associated system component.

9. The method of claim 1, further comprising the step of displaying at least one of vehicle or item dimension information and vehicle or item image information via the GUI.

10. An apparatus for managing an automated parking and storage facility using a GUI, comprising:

a displayed graphical representation of a floor of an automated parking and storage facility; and a plurality of graphical objects presented in relation to the floor, thereby representing the state of the floor, the plurality of graphical objects including the representation of an EES for ingress and egress of the automated parking and storage facility of a vehicle or item, a transport module for transporting the vehicle or item within the automated parking and storage facility, and a plurality of storage racks for storing the vehicle or item within the automated parking and storage facility.

11. The apparatus of claim 10, wherein a database of stored garage data is accessed via a database access screen of the GUI to view at least one of driver information, retrieve log information, retrieve cycle information, and store cycle information.

12. The apparatus of claim 10, wherein the graphical representation includes a plurality of floor representations, and each floor representation includes a transport module graphical object that is associated with a system component that operates in at least one of an x-axis direction, a y-axis direction, and a z-axis direction.

13. The apparatus of claim 12, wherein the transport module graphical object is associated with a vertical lift component when the system component operates in the z-axis direction, and with a carrier transport module when the system component operates in at least one of the x-axis direction and the y-axis direction.

14. The apparatus of claim 12, wherein each transport module graphical object has associated therewith unique diagnostic information that is viewable via a diagnostic screen by selecting the respective transport module graphical object.

15. The apparatus of claim 10, wherein the transport module graphical object has associated therewith boundary limit graphics that allow a user to limit the range of travel of a corresponding system component of the garage and storage facility by positioning via the GUI the boundary limit graphics in relation to the transport module graphical object.

16. The apparatus of claim 10, wherein the graphical object is moved automatically in relation to the movement of a system component to which the graphical object is associated.

17. The apparatus of claim 10, wherein the graphical object is changed from a first color to a second color in response to a corresponding change in operating status of an associated system component.

18. The apparatus of claim 10, wherein at least one of vehicle or item dimension information and vehicle or item image information is displayed via the GUI.

19. A method of managing an automated parking and storage facility via an interactive interface, comprising the steps of:

providing a management system of the automated parking and storage facility adapted to operate the interactive interface;

displaying a graphical representation of a facility component via the interactive interface, the graphical representation including a graphical object assigned to the facility component; and communicating a component signal of the facility component between the management system and the interactive interface.

20. The method of claim 19, wherein the facility component in the step of displaying is the graphical representation of a floor of the automated parking and storage facility.

21. The method of claim 20, wherein the floor is represented graphically as including a plurality of the graphical objects in relation to the floor, thereby representing a state of the floor, the plurality of graphical objects representing one of an entry/exit station for ingress and egress of a vehicle or item of the automated parking and storage facility, a transport module for transporting the vehicle or item within the automated parking and storage facility, and a plurality of storage racks for storing the vehicle or item within the automated parking and storage facility.

22. The method of claim 19, wherein the management system in the step of providing operatively communicates with an interactive node that is local to the parking garage and storage facility such that an operator at the interactive node accesses the management system via the interactive interface to monitor and control operation of the automated parking and storage facility.

23. The method of claim 19, wherein the management system in the step of providing operatively communicates with an interactive node remotely disposed on a global communication network such that an operator at the interactive node remotely accesses the management system via the interactive interface to monitor and control operation of the automated parking and storage facility.

24. The method of claim 19, wherein the interactive interface of the management system in the step of providing further includes a parking and storage facility web page such that a user at an interactive node accesses the parking and storage facility web page to obtain parking and storage facility information.

25. The method of claim 24, wherein the parking and storage facility information includes at least one of occupancy information and rate structure information.

26. The method of claim 24, wherein the parking and storage facility information facilitates a transaction by the user to secure a vehicle or item storage rack of the parking and storage facility.

27. The method of claim 19, wherein an operator at an interactive node in operative communication with the management system views a vehicle or item identification number via the interactive interface that is automatically sensed by the management system.

28. The method of claim 19, wherein the component signal is an alarm signal that is communicated to an operator in the step of communicating via at least one of display through the interactive interface, wireless transmission to a personal device, to a facsimile device and an e-mail address.

29. A system for managing an automated parking and storage facility via an interactive interface, comprising:

a management system of the automated parking and storage facility adapted to operate the interactive interface;

means for displaying a graphical representation of a facility component via the interactive interface, the graphical representation including a graphical object assigned to the facility component; and means for communicating a component signal of the facility component between the management system and the interactive interface.

30. The system of claim 29, wherein the facility component is the graphical representation of a floor of the automated parking and storage facility.

31. The system of claim 30, wherein the floor is represented graphically as including a plurality of the graphical objects in relation to the floor, thereby representing a state of the floor, the plurality of graphical objects representing one of an entry/exit station for ingress and egress of a vehicle or item of the automated parking and storage facility, a transport module for transporting the vehicle or item within the automated parking and storage facility, and a plurality of storage racks for storing the vehicle or item within the automated parking and storage facility.

32. The system of claim 29, wherein the management system operatively communicates with an interactive node that is local to the parking garage and storage facility such that an operator at the interactive node accesses the management system via the interactive interface to monitor and control operation of the automated parking and storage facility.

33. The system of claim 29, wherein the management system operatively communicates with an interactive node remotely disposed on a global communication network such that an operator at the interactive node remotely accesses the management system via the interactive interface to monitor and control operation of the automated parking and storage facility.

34. The system of claim 29, wherein interactive interface of the management system further includes a parking and storage facility web page such that a user at an interactive node accesses the parking and storage facility web page to obtain parking and storage facility information.

35. The system of claim 34, wherein the parking and storage facility information includes at least one of occupancy information and rate structure information.

36. The system of claim 34, wherein the parking and storage facility information facilitates a transaction by the user to secure a vehicle or item storage rack of the parking and storage facility.

37. The system of claim 29, wherein an operator at an interactive node in operative communication with the management system views a vehicle or item identification number via the interactive interface that is automatically sensed by the management system.

38. The system of claim 29, wherein the component signal is an alarm signal that is communicated to an operator via at least one of display through the interactive interface, wireless transmission to a personal device, to a facsimile device and an e-mail address.

39. The system of claim 29, wherein the management system further includes a dynamic garage management display external to the facility for remote management thereof.

40. A method of managing an automated parking and storage facility using a GUI, comprising the steps of:

displaying a graphical representation of a structure of the automated parking and storage facility; and presenting a plurality of graphical objects in relation to the structure, thereby representing the state of the structure, the plurality of graphical objects including the representation of an EES for ingress and egress of the automated parking and storage facility of an item, a transport module for transporting the item within the automated parking and storage facility, and a plurality of storage racks for storing the item.

* * * * *